United States Patent
Reunamaki et al.

(10) Patent No.: US 9,451,436 B2
(45) Date of Patent: Sep. 20, 2016

(54) METHOD, APPARATUS, AND COMPUTER PROGRAM PRODUCT FOR WIRELESS DEVICE DISCOVERY

(71) Applicant: Nokia Corporation, Espoo (FI)

(72) Inventors: Jukka Reunamaki, Tampere (FI); Arto Palin, Viiala (FI)

(73) Assignee: Nokia Technologies Oy, Espoo (FI)

(*) Notice: Subject to any disclaimer, the term of this patent is extended or adjusted under 35 U.S.C. 154(b) by 318 days.

(21) Appl. No.: 13/906,860

(22) Filed: May 31, 2013

(65) Prior Publication Data
US 2014/0355517 A1    Dec. 4, 2014

(51) Int. Cl.
*H04W 4/00*    (2009.01)
*H04W 8/00*    (2009.01)
*H04W 84/18*   (2009.01)

(52) U.S. Cl.
CPC ............ *H04W 8/005* (2013.01); *H04W 4/008* (2013.01); *H04W 84/18* (2013.01)

(58) Field of Classification Search
CPC ... H04W 84/18; H04W 4/008; H04W 8/005; H04W 52/0274; H04W 16/14; H04W 76/02; H04W 2250/02; H04B 17/318
USPC .............................. 370/328; 455/41.2; 701/48
See application file for complete search history.

(56) References Cited

U.S. PATENT DOCUMENTS

| | | | |
|---|---|---|---|
| 5,193,216 A | 3/1993 | Davis | |
| 5,471,671 A | 11/1995 | Wang et al. | |
| 5,732,347 A | 3/1998 | Bartle et al. | |
| 8,547,867 B2 | 10/2013 | Koo et al. | |
| 2006/0258338 A1 | 11/2006 | Markki et al. | |
| 2007/0253339 A1 | 11/2007 | Ovadia et al. | |
| 2008/0107054 A1 | 5/2008 | Parts et al. | |
| 2008/0151845 A1 | 6/2008 | Jaakkola et al. | |
| 2010/0035567 A1 | 2/2010 | Vin | |
| 2010/0079607 A1 | 4/2010 | Won et al. | |
| 2010/0244587 A1 | 9/2010 | Tiovola et al. | |
| 2010/0317289 A1 | 12/2010 | Desai et al. | |
| 2011/0021142 A1* | 1/2011 | Desai .................... H04W 8/005 455/41.2 |
| 2011/0022661 A1 | 1/2011 | Alsina | |
| 2011/0255444 A1 | 10/2011 | Soliman et al. | |
| 2011/0319020 A1 | 12/2011 | Desai et al. | |
| 2011/0319022 A1 | 12/2011 | Arad et al. | |

(Continued)

OTHER PUBLICATIONS

"Specification of the Bluetooth System Core v4.0, vol. 1", Jun. 30, 2010, pp. 107-243.

(Continued)

*Primary Examiner* — Dang Ton
*Assistant Examiner* — Lionel Preval
(74) *Attorney, Agent, or Firm* — Locke Lord LLP

(57) ABSTRACT

Method, apparatus, and computer program product example embodiments enhance wireless communications device discovery processes. In an example embodiment, a method comprises detecting, by an apparatus, a sequence of wireless device advertising channel messages in a first communications protocol during device discovery scans of the first communications protocol; and multiplexing, by the apparatus, transmission of a sequence of wireless device discovery messages in a second communications protocol, with the detected sequence of wireless device advertising channel messages in the first communications protocol, in response to the detecting of the sequence of wireless device advertising channel messages in the first communications protocol.

20 Claims, 18 Drawing Sheets

(56) References Cited

U.S. PATENT DOCUMENTS

| | | |
|---|---|---|
| 2012/0068921 A1 | 3/2012 | Jacobsen et al. |
| 2012/0289157 A1 | 11/2012 | Palin et al. |
| 2012/0289158 A1 | 11/2012 | Palin et al. |
| 2012/0289160 A1 | 11/2012 | Palin et al. |
| 2013/0090061 A1 | 4/2013 | Linde |
| 2013/0109315 A1 | 5/2013 | Polo et al. |
| 2013/0188538 A1 | 7/2013 | Kainulainen et al. |
| 2013/0260688 A1 | 10/2013 | Palin et al. |
| 2014/0018002 A1 | 1/2014 | Jose et al. |
| 2014/0073244 A1 | 3/2014 | Ko et al. |
| 2014/0188348 A1* | 7/2014 | Gautama ............... B60W 10/30 701/48 |
| 2014/0302849 A1 | 10/2014 | Palin et al. |
| 2014/0315491 A1 | 10/2014 | Preiszler et al. |
| 2014/0355517 A1 | 12/2014 | Reunamaki et al. |
| 2014/0370811 A1 | 12/2014 | Kang et al. |
| 2015/0126117 A1 | 5/2015 | Wong et al. |
| 2015/0296329 A1 | 10/2015 | Mao et al. |
| 2015/0365999 A1 | 12/2015 | Lee et al. |
| 2016/0072855 A1 | 3/2016 | Palin et al. |

OTHER PUBLICATIONS

Extended European Search Report for Application No. 14163540.9-1854 dated Oct. 21, 2014.

Link Controller Operation Chapter—Bluetooth_Core_V4 0, vol. 2, pp. 150 to 191 of 1114.

* cited by examiner

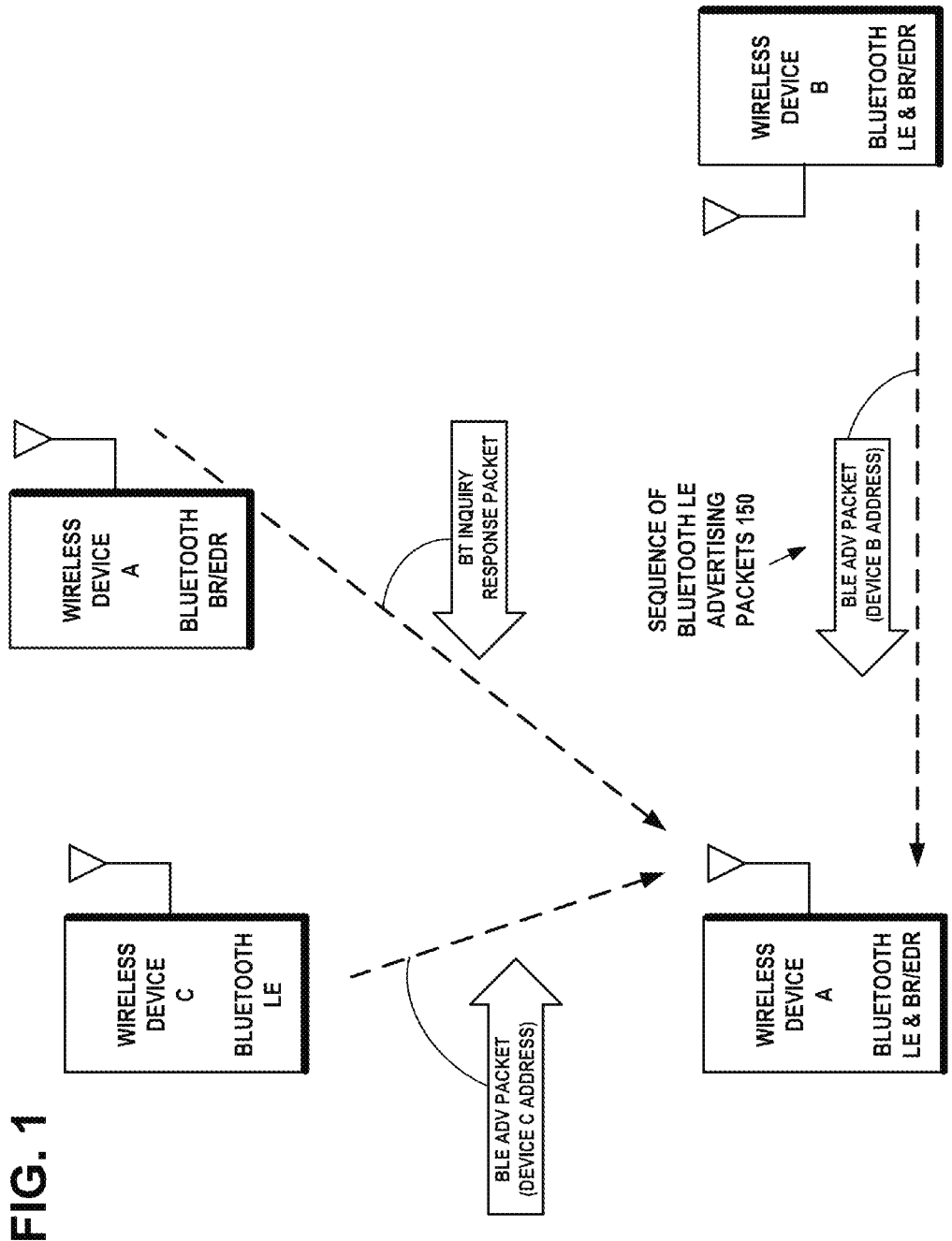

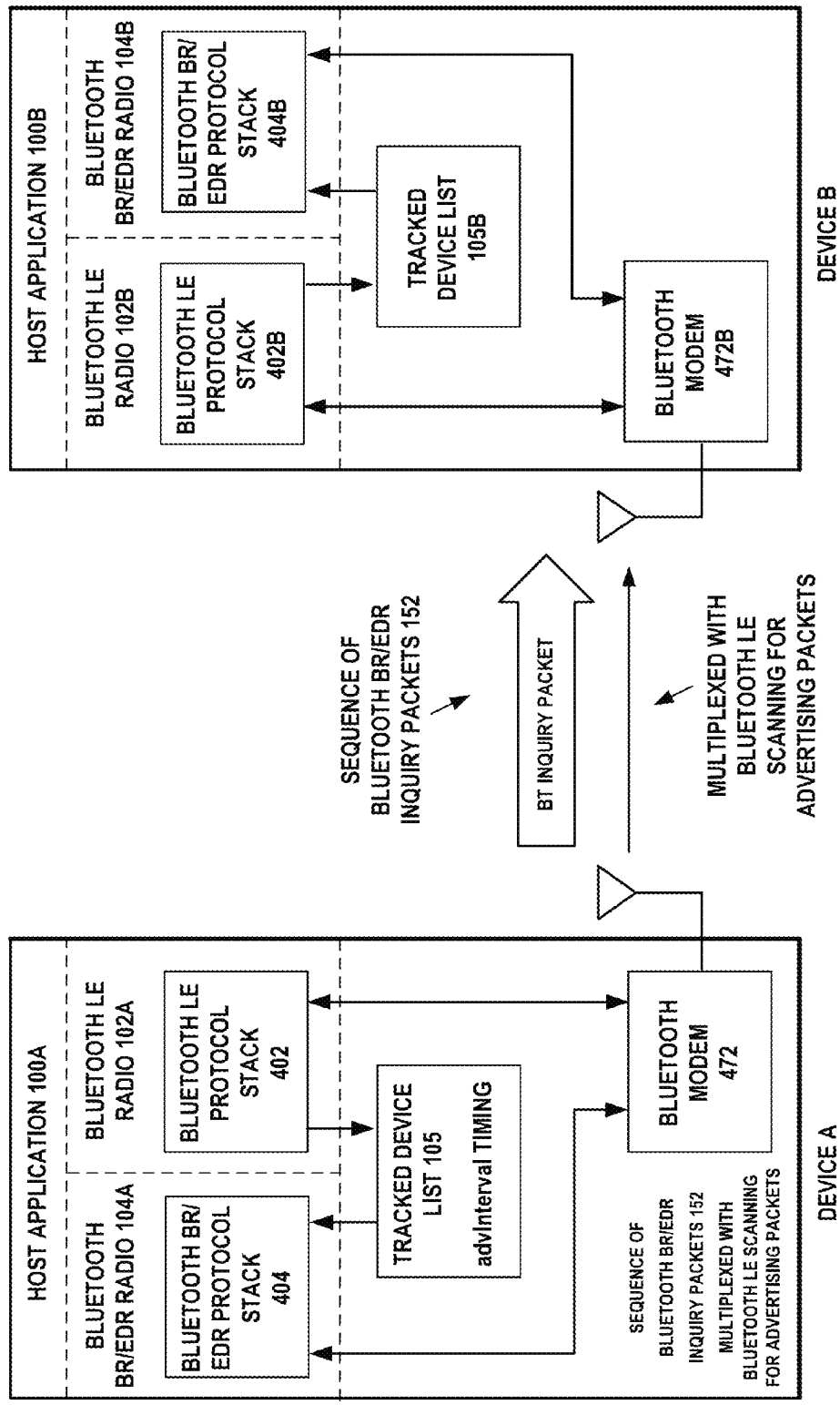

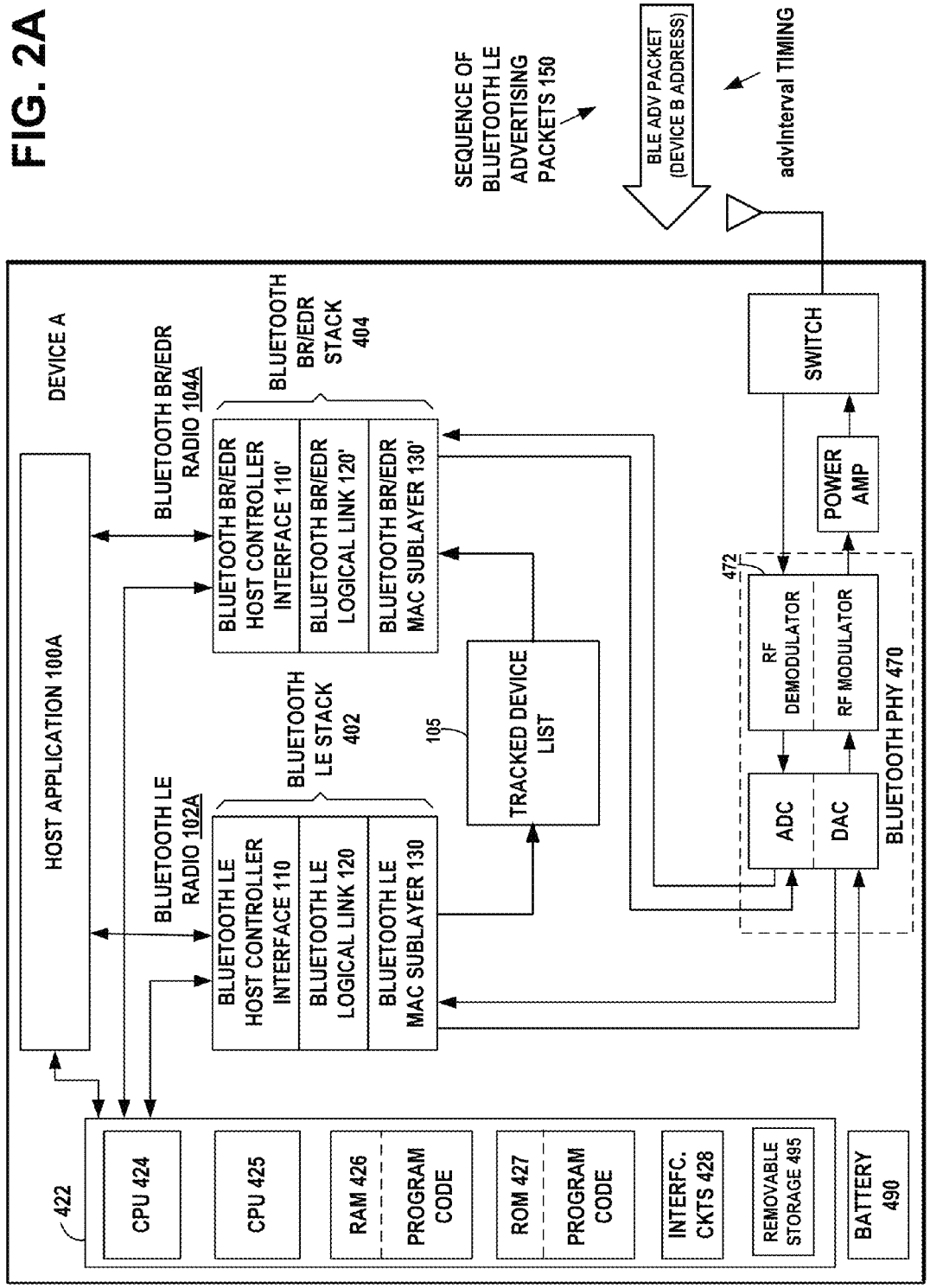

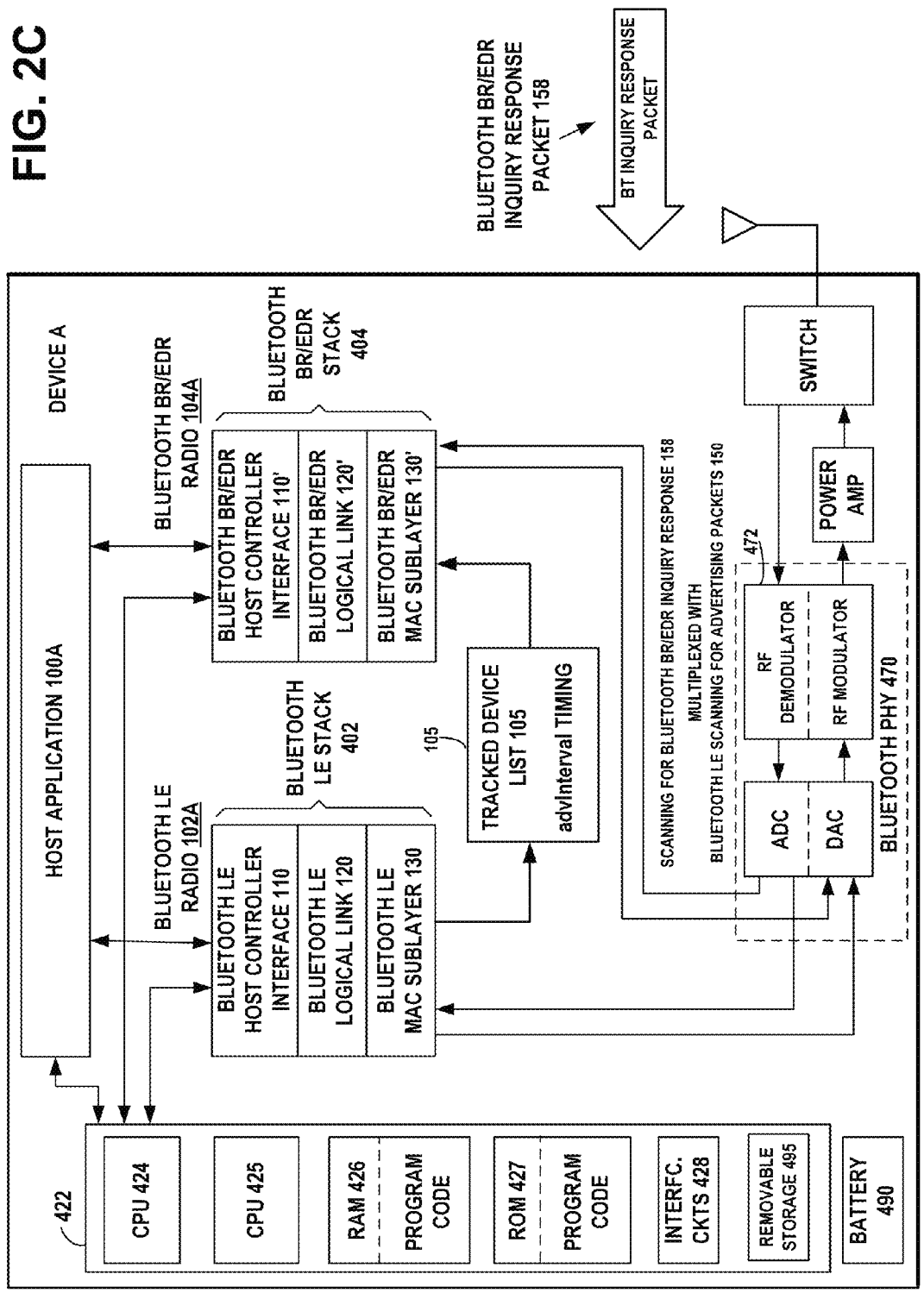

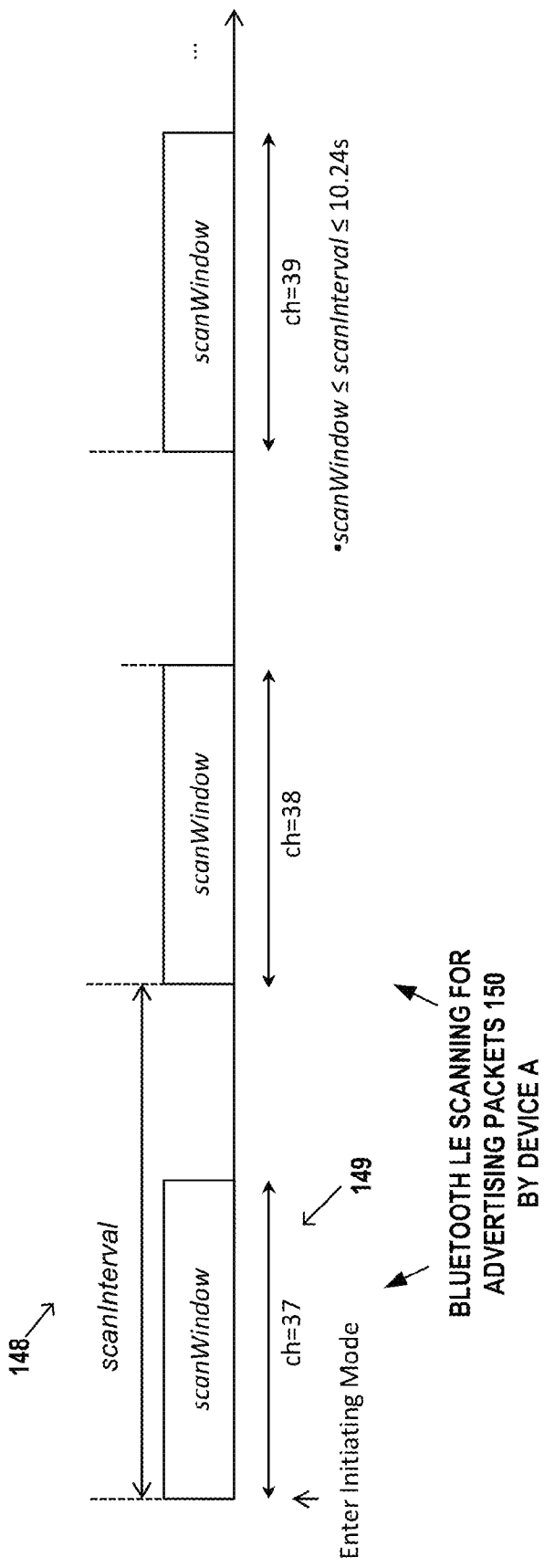

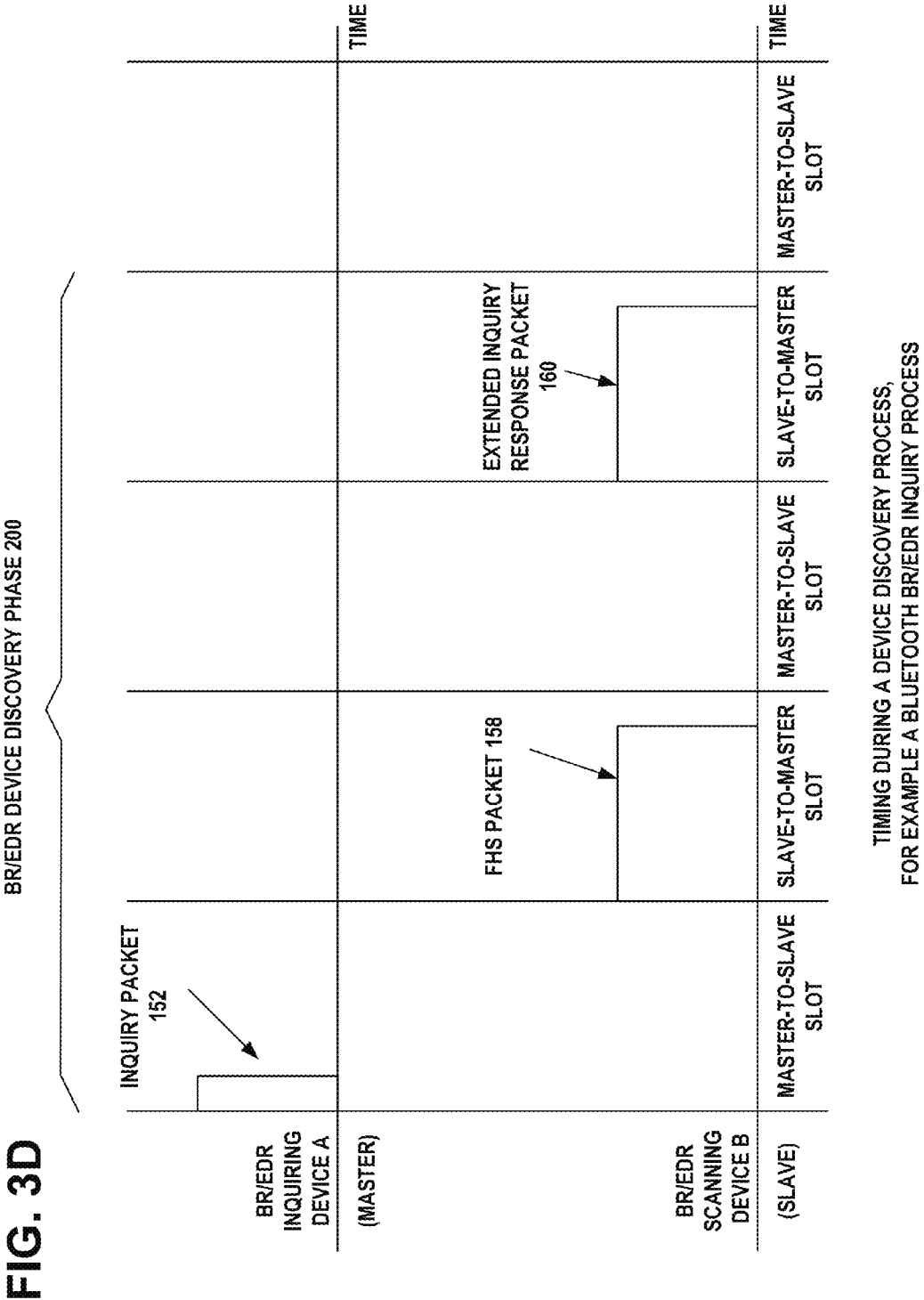

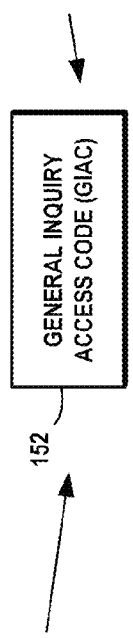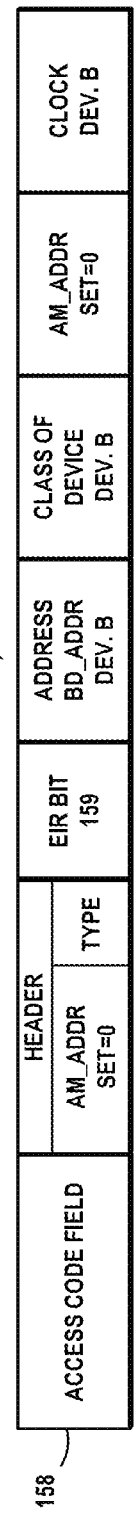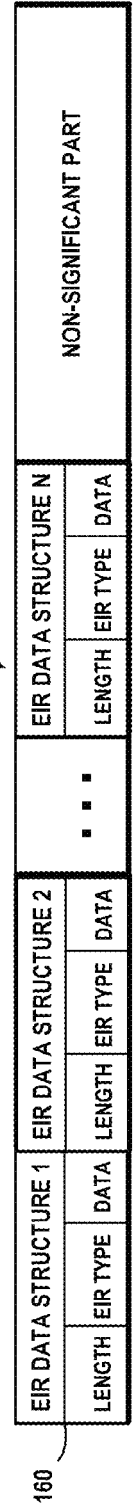

STEP 552: DETECTING, BY AN APPARATUS, A SEQUENCE OF WIRELESS DEVICE ADVERTISING CHANNEL MESSAGES IN A FIRST COMMUNICATIONS PROTOCOL DURING DEVICE DISCOVERY SCANS OF THE FIRST COMMUNICATIONS PROTOCOL; AND

STEP 554: MULTIPLEXING, BY THE APPARATUS, TRANSMISSION OF A SEQUENCE OF WIRELESS DEVICE DISCOVERY MESSAGES IN A SECOND COMMUNICATIONS PROTOCOL, WITH THE DETECTED SEQUENCE OF WIRELESS DEVICE ADVERTISING CHANNEL MESSAGES IN THE FIRST COMMUNICATIONS PROTOCOL, IN RESPONSE TO THE DETECTING OF THE SEQUENCE OF WIRELESS DEVICE ADVERTISING CHANNEL MESSAGES IN THE FIRST COMMUNICATIONS PROTOCOL.

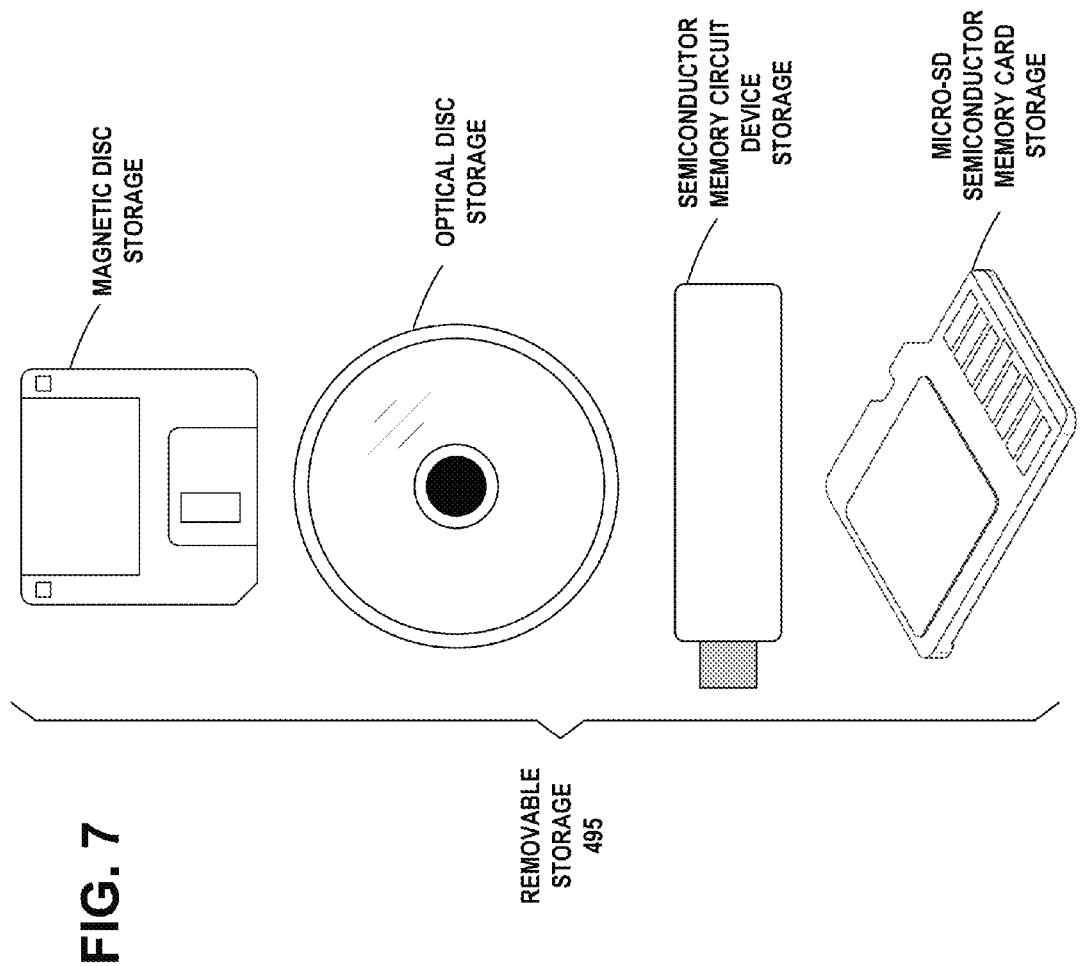

METHOD, APPARATUS, AND COMPUTER PROGRAM PRODUCT FOR WIRELESS DEVICE DISCOVERY

FIELD

The technology field relates to controlling device discovery process based on received discovery messages.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. Bluetooth™ *Specification version 2.0+EDR*, published Oct. 15 2004 has the original functional characteristics of the first version Bluetooth™ Basic Rate (BR) and adds the Enhanced Data Rate (EDR) feature. Bluetooth™ *Specification version 2.1+EDR*, published Jul. 26 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth™ *Specification version 3.0+HS*, published Apr. 21 2009, updated the standard to integrate the Alternate MAC/PHY and Unicast Connectionless Data features.

The Bluetooth™ *Core Specification, Version 4.0*, Bluetooth™ SIG, Jun. 30, 2010 (incorporated herein by reference), includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments enhance wireless communications device discovery processes.

An example embodiment of the invention includes a method comprising:

detecting, by an apparatus, a sequence of wireless device advertising channel messages in a first communications protocol during device discovery scans of the first communications protocol; and multiplexing, by the apparatus, transmission of a sequence of wireless device discovery messages in a second communications protocol, with the detected sequence of wireless device advertising channel messages in the first communications protocol, in response to the detecting of the sequence of wireless device advertising channel messages in the first communications protocol.

An example embodiment of the invention includes a method comprising:

synchronizing, by the apparatus, timing of the device discovery scans with the detected sequence of wireless device advertising channel messages in the first communications protocol.

An example embodiment of the invention includes a method comprising:

multiplexing, by the apparatus, device discovery scanning of wireless device response messages in the second communications protocol, with the detected sequence wireless device advertising channel messages in the first communications protocol, in response to the detecting of the sequence of wireless device advertising channel messages in the first communications protocol.

An example embodiment of the invention includes a method comprising:

determining, by the apparatus, that at least one of the wireless device advertising channel messages in the first communications protocol and the wireless device response messages in the second communications protocol, meets a predefined criterion of a received signal strength indication exceeding a threshold value.

An example embodiment of the invention includes a method comprising:

initiating, by the apparatus, establishment of a wireless connection with a source device of one or more wireless device advertising channel messages that meets the predefined criterion of a received signal strength indication exceeding a threshold value.

An example embodiment of the invention includes a method comprising:

displaying, by the apparatus, an indication that a wireless connection will be automatically established with the source device of the one or more wireless device advertising channel messages that meet the predefined criterion.

An example embodiment of the invention includes a method comprising:

initiating, by the apparatus, establishment of a wireless connection with a source device of one or more wireless device response messages that meets the predefined criterion of a received signal strength indication exceeding a threshold value.

An example embodiment of the invention includes a method comprising:

displaying, by the apparatus, an indication that a wireless connection will be automatically established with the source device of the one or more wireless device response messages that meet the predefined criterion.

An example embodiment of the invention includes a method comprising:

wherein the first communications protocol is a Bluetooth Low Energy protocol and the second communications protocol is a Bluetooth BR/EDR protocol.

An example embodiment of the invention includes an apparatus comprising:

at least one processor;

at least one memory including computer program code;

the at least one memory and the computer program code configured to, with the at least one processor, cause the apparatus at least to:

detect a sequence of wireless device advertising channel messages in a first communications protocol during device discovery scans of the first communications protocol; and multiplex transmission of a sequence of wireless device discovery messages in a second communications protocol, with the detected sequence of wireless device advertising channel messages in the first communications protocol, in response to the detecting of the sequence of wireless device advertising channel messages in the first communications protocol.

An example embodiment of the invention includes an apparatus comprising:

the at least one memory and the computer program code configured to, with the at least one processor, cause the apparatus at least to:

synchronize timing of the device discovery scans with the detected sequence of wireless device advertising channel messages in the first communications protocol.

An example embodiment of the invention includes an apparatus comprising:

the at least one memory and the computer program code configured to, with the at least one processor, cause the apparatus at least to:

multiplex device discovery scanning of wireless device response messages in the second communications protocol, with the detected sequence wireless device advertising channel messages in the first communications protocol, in response to the detecting of the sequence of wireless device advertising channel messages in the first communications protocol.

An example embodiment of the invention includes an apparatus comprising:

the at least one memory and the computer program code configured to, with the at least one processor, cause the apparatus at least to:

determine that at least one of the wireless device advertising channel messages in the first communications protocol and the wireless device response messages in the second communications protocol, meets a predefined criterion of a received signal strength indication exceeding a threshold value.

An example embodiment of the invention includes an apparatus comprising:

the at least one memory and the computer program code configured to, with the at least one processor, cause the apparatus at least to:

initiate establishment of a wireless connection with a source device of one or more wireless device advertising channel messages that meets the predefined criterion of a received signal strength indication exceeding a threshold value.

An example embodiment of the invention includes an apparatus comprising:

the at least one memory and the computer program code configured to, with the at least one processor, cause the apparatus at least to:

display an indication that a wireless connection will be automatically established with the source device of the one or more wireless device advertising channel messages that meet the predefined criterion.

An example embodiment of the invention includes an apparatus comprising:

the at least one memory and the computer program code configured to, with the at least one processor, cause the apparatus at least to:

initiate establishment of a wireless connection with a source device of one or more wireless device response messages that meets the predefined criterion of a received signal strength indication exceeding a threshold value.

An example embodiment of the invention includes an apparatus comprising:

the at least one memory and the computer program code configured to, with the at least one processor, cause the apparatus at least to:

display an indication that a wireless connection will be automatically established with the source device of the one or more wireless device response messages that meet the predefined criterion.

An example embodiment of the invention includes an apparatus comprising:

wherein the first communications protocol is a Bluetooth Low Energy protocol and the second communications protocol is a Bluetooth BR/EDR protocol.

An example embodiment of the invention includes a computer program product comprising computer executable program code recorded on a computer readable, non-transitory storage medium, the computer executable program code comprising:

code for detecting, by an apparatus, a sequence of wireless device advertising channel messages in a first communications protocol during device discovery scans of the first communications protocol; and code for multiplexing, by the apparatus, transmission of a sequence of wireless device discovery messages in a second communications protocol, with the detected sequence of wireless device advertising channel messages in the first communications protocol, in response to the detecting of the sequence of wireless device advertising channel messages in the first communications protocol.

An example embodiment of the invention includes a computer program product comprising:

code for multiplexing, by the apparatus, device discovery scanning of wireless device response messages in the second communications protocol, with the detected sequence wireless device advertising channel messages in the first communications protocol, in response to the detecting of the sequence of wireless device advertising channel messages in the first communications protocol.

The resulting example embodiments enhance wireless communications device discovery processes.

DESCRIPTION OF THE FIGURES

FIG. 1 is an example network diagram of four communication devices, two devices each having both a Bluetooth LE radio and a Bluetooth BR/EDR radio, a third device with only a Bluetooth LE radio and a fourth device with only a Bluetooth BR/EDR radio, in accordance with at least one embodiment of the present invention.

FIG. 1B is the example network diagram of FIG. 1A, wherein the Bluetooth LE radio in the first communication device A, stores the Bluetooth LE advInterval timing in a tracked device list that is shared with the Bluetooth BR/EDR radio. The Bluetooth BR/EDR radio in the first communication device A then multiplexes transmission of a sequence of Bluetooth BR/EDR inquiry packets in the Bluetooth BR/EDR communications protocol, multiplexing it with the detected sequence of Bluetooth LE advertising channel messages in the Bluetooth LE communications protocol, in response to the detecting of the sequence Bluetooth LE advertising channel messages, in accordance with at least one embodiment of the present invention.

FIG. 2A is an example functional block diagram of the multi-radio communication device A of FIG. 1A, showing additional details of the Bluetooth LE radio and the Bluetooth BR/EDR radio. The first communication device A is shown synchronizing its timing of its device discovery scans with the Bluetooth LE advInterval timing of the detected sequence of Bluetooth LE advertising channel messages in the Bluetooth LE communications protocol, in accordance with at least one embodiment of the present invention.

FIG. 2C is the example functional block diagram of FIG. 2A, wherein the Bluetooth BR/EDR radio in the first communication device A multiplexes device discovery scanning of inquiry response messages in the Bluetooth BR/EDR communications protocol, multiplexing it with the detected sequence Bluetooth LE advertising channel messages in the Bluetooth LE communications protocol, in response to the detecting of the sequence Bluetooth LE advertising channel messages. The first communication device A may determine that at least one of the Bluetooth LE advertising channel messages in the Bluetooth LE communications protocol and the inquiry response messages in the Bluetooth BR/EDR communications protocol, meets a predefined criterion of a received signal strength indication exceeding a threshold value. The first communication device A may estimate a distance to a second communication device B that transmitted at least one of the Bluetooth LE advertising channel messages in the Bluetooth LE communications protocol and the inquiry response messages in the Bluetooth BR/EDR communications protocol, based on the received signal strength indication. The first communication device A may determine that the second communication device B is within a distance from the first communication device A, which indicates touching-related operations may be executed, based on the received signal strength indication, in accordance with at least one embodiment of the present invention.

FIG. 3B is an example embodiment of a timing chart for Bluetooth LE scanning by the first communication device A to discover Bluetooth LE advertising messages, wherein the scanner device repeats scanning during a scanInterval, each of which contains a scanWindow, in accordance with an example embodiment of the invention.

FIG. 3D is an illustration of an example timing diagram of the Bluetooth BR/EDR device discovery process, using the Bluetooth communications standard, in accordance with at least one embodiment of the present invention.

FIG. 4A is an illustration of an example message format for Bluetooth BR/EDR inquiry, device discovery message, using the Bluetooth communications standard, in accordance with at least one embodiment of the present invention.

FIG. 4B is an illustration of an example message format for Bluetooth BR/EDR inquiry response, discovery response message, using the Bluetooth communications standard, in accordance with at least one embodiment of the present invention.

FIG. 4C is an illustration of an example message format for Bluetooth BR/EDR extended inquiry response, discovery response message, using the Bluetooth communications standard, in accordance with at least one embodiment of the present invention.

FIG. 5B is an example flow diagram 550 of an example method performed by the multi-radio communication device A, in accordance with an example embodiment of the invention.

FIG. 7 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

DISCUSSION OF EXAMPLE EMBODIMENTS OF THE INVENTION

Figure 1A:
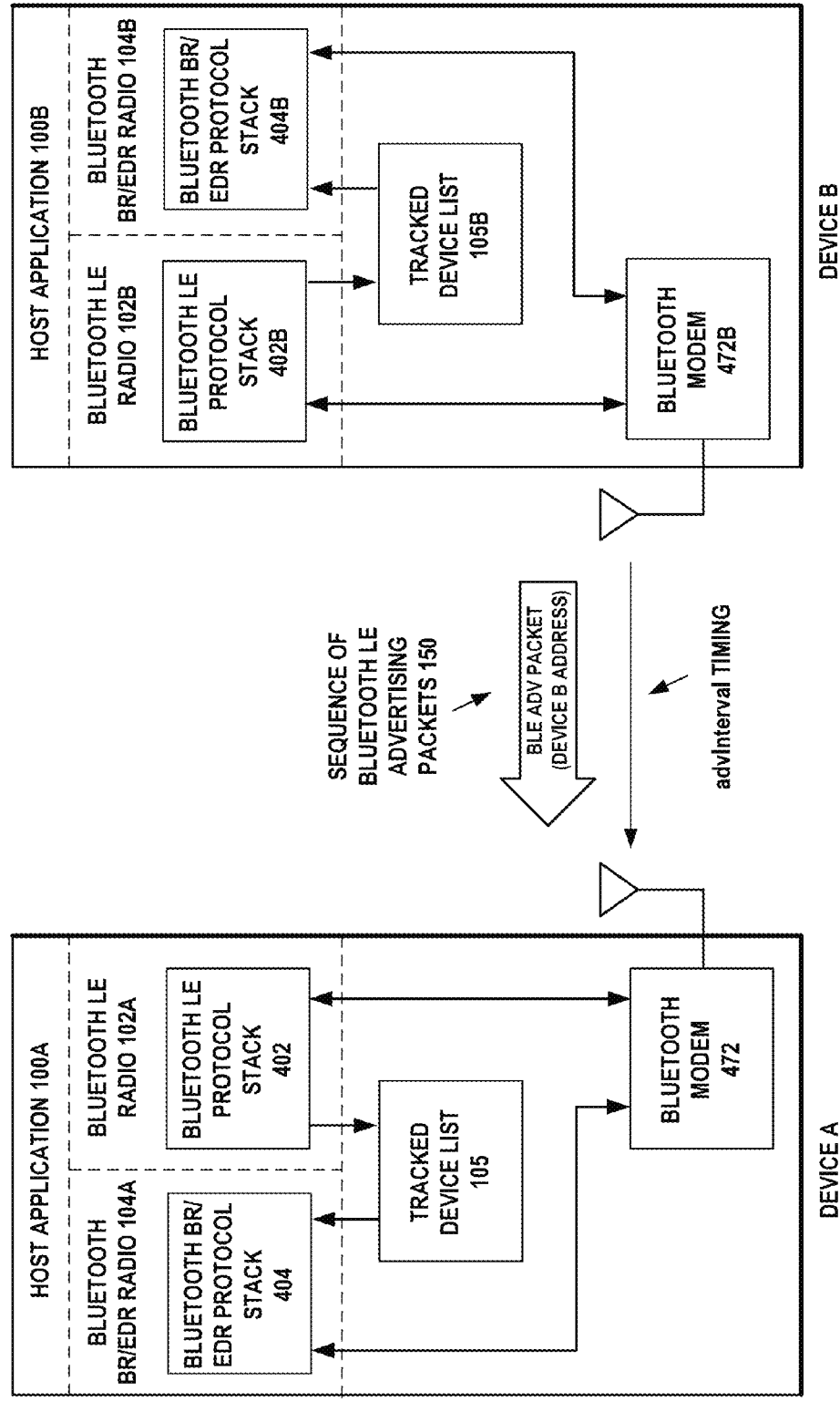
FIG. 1A is an example network diagram of two multi-radio communication devices, each with a Bluetooth LE radio and a Bluetooth BR/EDR radio, with a first communication device A detecting a sequence of Bluetooth LE advertising channel messages in the Bluetooth LE communications protocol during device discovery scans. The first communication device A synchronizes its timing of the device discovery scans with the Bluetooth LE advInterval timing of the detected sequence of Bluetooth LE advertising channel messages in the Bluetooth LE communications protocol, in accordance with at least one embodiment of the present invention.

This section is organized into the following topics:
A. Wireless Short-Range Communication Networks
B. Bluetooth™ BR/EDR Technology
C. Bluetooth™ Low Energy (LE) Technology
D. Touch-to-Select in Bluetooth Technology
E. Wireless Device Discovery A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ BR/EDR Technology

A procedure for forming connections between Bluetooth™ devices is described in the Bluetooth™ *Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

1. Inquiry

Inquiry is a procedure where a Bluetooth™ device transmits inquiry messages and listens for responses in order to discover the other Bluetooth™ devices that are within the coverage area and set discoverable. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over 79 physical channels. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. During the inquiry substate, the discovering device can collect the Bluetooth™ device addresses of all devices that respond to the inquiry message. In addition, the discovering device may also collect extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval shall be less than or equal to 2.56 s.

2. Inquiry Response

An inquiry response packet (frequency hop sequence (FHS)) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28 s MAX_RAND may be as small as 127. A profile that uses a DIAC may choose to use a smaller MAX_RAND than 1023 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

The inquiry response can be received by the inquiring devices within roughly 80 or 640 ms depending on inquiry scan interval of the discovered device. The random backoff for devices using scanning interval <1.28 s is from 0 to 79,375 ms and for other devices from 0 to 639,375 ms. The device using the default inquiry interval is using the latter value range.

In order to collect responses from all devices in the range in an error-free environment, the inquiry substate may have to last for 10.24 s unless the inquirer collects enough responses and aborts the inquiry substate earlier. If desired, the inquirer may also prolong the inquiry substate to increase the probability of receiving all responses in an error-prone environment. In consequence of long inquiry state compared to relatively short backoff times, multiple responses may be received from the single device.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Pane

Page is the initial phase of the connection procedure where a device transmits a train of page messages until a response is received from the target device, stopped by the host or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address of the slave device. The necessary information may be received by other means, such as Out-Of-Band pairing. Also the page is not always preceded with inquiry, because the address may be known beforehand (for example saved from previous connections). In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy shall be +/−6 dBm or better.

RSSI Monitoring of Inquiry Response and Extended Inquiry Response Packets

During Bluetooth discovery, before a connection is created, the RSSI is measured from Inquiry Response (FHS) packets when it is received by an inquiring device if enabled by the host.

When the controller receives an Inquiry Response (FHS) without following an Extended Inquiry Response, an HCI Inquiry Result with RSSI event is sent by the controller to the host application, which indicates that a remote Bluetooth device has responded during the current Inquiry process. This event will be sent from the Controller to the Host as soon as an Inquiry Response from a remote device is received. The RSSI parameter is measured during the FHS packet returned by each responding slave.

When the controller receives an Inquiry Response (FHS) following with an Extended Inquiry Response, an HCI Extended Inquiry Result event is sent by the controller to the host application, which indicates that a remote Bluetooth device has responded during the current inquiry process with extended inquiry response data. This event will be sent from the Controller to the Host upon reception of an Extended Inquiry Response from a remote device. One single Extended Inquiry Response is returned per event. This event contains RSSI and inquiry response data for the remote device that responded to the latest inquiry. The RSSI parameter is measured during the FHS packet returned by each responding slave.

RSSI Monitoring of Data Packets Received Over a Connection

After the discovery phase is completed, once a Bluetooth device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Extended Inquiry Response packet indicates the transmitted power level of the FHS and EIR packets at the transmitter of the sending device. The TX Power Level data field may be used to calculate path loss of a received packet when the receiving device measures the RSSI of the received FHS packet, using the following equation:

$$pathloss = Tx\ Power\ Level - RSSI\ of\ the\ inquiry\ response\ packet$$

For example, if Tx Power Level=+4 (dBm) and the RSSI on the inquiry response packet is −60 (dBm) then the total pathloss is +4−(−60)=+64 dB. If a second inquiry response packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple inquiry response packets are received from the same device.

6. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

The device discovery group of commands and events allow a device to discover other devices in the surrounding area. The host controller interface includes the standard HCI Inquiry Result Event logic and HCI Extended Inquiry Result Event logic that recognizes the receipt of the FHS packet and the following EIR packet, respectively. Some of the HCI commands and events for device discovery are described as follows:

Inquiry Command

The HCI Inquiry command will cause the Bluetooth Controller to enter Inquiry Mode to transmit inquiry packets used to discover other nearby Bluetooth devices.

Inquiry Result Event

HCI Inquiry Result Event: The inquiry result event indicates that a remote device has responded with an inquiry response (IR), i.e. with an FHS packet, during the current inquiry process. This event will be sent from the Bluetooth™ Controller to the Host as soon as an Inquiry Response from a remote device is received. The event parameters in the HCI inquiry result event include BD_ADDR and Class_of_Device of the remote responding device and Clock_Offset OFFSET(A,B) between the responding device and the inquiring device.

Inquiry Result with RSSI Event

The Inquiry Result with RSSI event indicates that a remote Bluetooth device has responded with an inquiry response (FHS) packet during the current Inquiry process. The event reported to the host includes the BD_ADDR address for the device that responded, the Class of Device for the device, the clock offset between the responding device and the receiving device, and the measured RSSI of the received inquiry response packet in units of dBm. This is similar to the inquiry result event, but it includes the RSSI value calculated by the controller.

Extended Inquiry Result Event

HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. The event reported to the host includes the received signal strength indication (RSSI) measurement and inquiry response data for the device that responded to the latest inquiry. The RSSI parameter is measured during the FHS packet returned by each responding device. If an extended inquiry response packet from the same remote device is correctly received in a later response, another event is generated. The Extended_Inquiry_Response data fields are not interpreted by the controller. The standard HCI Extended Inquiry Result Event logic performs the HCI extended inquiry result event procedure to extract the data from the received extended inquiry response packet and to send this data to the host application. The received EIR data extracted from the packet may be passed unaltered to the host application.

Read Inquiry Response Transmit Power Level Command

This command will read the inquiry response Transmit Power level data, expressed in a field of the EIR packet, indicating the power that was used to transmit the FHS and EIR data packets during the discovery phase.

HCI Write Extended_Inquiry_Response Command

The Write Extended_Inquiry_Response command writes the extended inquiry response to be sent to an inquiring device during the extended inquiry response procedure. The write extended inquiry response command will write the data that the device's host wishes to send in the extended inquiry response packet during inquiry response. The FEC Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

Write Inquiry Transmit Power Level Command

The Write Inquiry Transmit Power Level command is used by the transmitting device to write the transmit power level used to transmit the inquiry data packets.

Connection Phase HCI Commands and Events

Read RSSI Command

After the discovery phase is completed, once a Bluetooth device is connected to another Bluetooth device, the received signal strength indication (RSSI) may be used by a receiving device to monitor the received power level of the data communication packets received over the connection.

The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For a Basic Rate/Enhanced Data Rate (BR/EDR) Controller, a Connection_Handle is used as the Handle command parameter and return parameter. The RSSI parameter returns the difference between the measured Received Signal Strength Indication (RSSI) and the limits of the Golden Receive Power Range for a Connection Handle to another BR/EDR Controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the BR/EDR Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

Read Transmit Power Level Command

The Read Transmit Power Level command will read the values for the Transmit Power Level parameter for the specified Connection_Handle for data communication packets during the connection phase, in a range of −30 to +20 dBm.

C. Bluetooth™ Low Energy (LE) Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, up to a maximum of 27 octets of payload, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, a scanner/initiator may make a connection request using the same advertising PHY channel on which it received the connectable advertising packet. The advertising event is ended and connection events begin if the advertiser receives and accepts the request for a connection to be initiated. Once a connection is established, the scanner/initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:
  Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.
  Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.
  If any advertising PDU is received by an initiator/scanner, it means the initiator successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

2. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy shall be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of $-127 \leq N \leq +20$. This event will be sent from the Controller to the Host as soon as an advertising packet from a remote device is received. The RSSI parameter is measured during the receipt of the advertising packet. This event contains RSSI and advertising packet data for the remote device.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$\text{pathloss} = Tx \text{ Power Level} - \text{RSSI of the inquiry response packet}$$

For example, if Tx Power Level=+4 (dBm) and the RSSI on the received packet is −60 (dBm) then the total pathloss is +4−(−60)=+64 dB. If a second packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

3. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

Connection Phase HCI Commands and Events

HCI LE Read Advertising Channel Tx Power Command

The TX Power Level is reported to the host in response to the HCI LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection_Handle is used as the Handle command parameter and return parameter. The meaning of the RSSI metric is an absolute receiver signal strength value in dBm to ±6 dBm accuracy.

The RSSI parameter returns the difference between the measured Received Signal Strength Indication (RSSI) and the limits of the Golden Receive Power Range for a Connection Handle to another Controller. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

4. Bluetooth Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:
Service Discovery from the peer device;
Characteristic Discovery from the peer device;
Configuration of Alert on Link Loss to the peer device;
Alert on Link Loss to the peer device;
Reading Tx Power from the peer device; and
Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

D. Touch-to-Select in Bluetooth Technology

The Bluetooth Touch-to-select feature employs Received Signal Strength Indication (RSSI) information calculated from the FHS packet, which is used in determining that an inquiry scanning device is within "touch range", i.e. proximate or in close proximity of the inquiring device, and when a threshold for that close proximity is met. This may provide an "intent to share" or "touch to connect" feature.

The inquiring device may measure the signal strength (e.g., RSSI) of each response message from an inquiry scanning device, which may be used in ordering the responding devices. In this manner, the inquiry scanning device with the highest measured signal strength may be listed first (e.g., wherein the measured signal strength may correlate to the distance between the inquiring device and the responding inquiry scanning device).

An inquiry scanning device receiving inquiry packets from an inquiring device may respond by transmitting an inquiry response FHS packet or an FHS packet followed by an EIR packet. The host in the inquiring device may recognize EIR events triggered by the responses. The reported EIR events may include RSSI measurement values made by the inquiring device on the received FHS packets. From the RSSI values, the host in the inquiring device may detect when an inquiry scanning device is most likely within "touching range", that is within a distance from the inquiring device that indicates touching-related operations may be executed.

It may also be possible to determine when an inquiry scanning device is moving closer to an inquiring device. The Bluetooth controller in the inquiring device may report the receipt of FHS and/or EIR inquiry responses to its host software stack as an HCI Inquiry Event that may contain the measurement of the RSSI performed on the received response. In instances where EIR responses are received, the Bluetooth controller in the inquiring device may report each received EIR as an HCI Extended Inquiry Result Event. When an inquiry scanning device moves closer to an inquiring device, the Bluetooth controller in the inquiring device may report an RSSI for each inquiry response, thereby enabling the inquiring device to track the changing RSSI levels of the scanning device and thus its relative movement. When the measured RSSI satisfies predetermined response criteria (e.g., including the RSSI being measured to be at or above a predetermined level), the corresponding scanning device may be selected for touch-related operations (e.g., expedited connection establishment).

The Bluetooth controller in an inquiring device reports the receipt of inquiry responses to its host, which also has Touch selection software running Typical response criteria may include RSSI values measured on the responses, being sensed above certain fixed threshold value, such as −30 dBm. Sensing a response packet having an RSSI of −30 dBm will then cause the Touch selection software in the inquiring device to trigger device selection, while an RSSI of −31 dBm will not. It may also be possible that responding inquiry scanning devices may send Tx power information in EIR packet, since this is an existing feature in the Bluetooth specification v4.0. In instances where Tx power information about the inquiry scanning device is available in the EIR packet, the predetermined response criteria may include an adjustable RSSI threshold value that accounts for variations in the Tx power. For example, the threshold value may be set at 30 dBm below the EIR Tx power, so that if the Tx power level in an FHS packet is +20 dBm then the threshold value that will trigger selection may be the FHS packet being measured at −10 dBm, or 30 dBm below of Tx power level. Secondly, to ensure that devices are maintained in close proximity, the predetermined response criteria may require that more than one EIR must have a sensed RSSI at or above a threshold value. In addition different thresholds may be used for different phases, for example, first the threshold value may be set above −45 dBm to select one or more candidate devices and then a second, more decisive threshold value may be set above −30 dBm.

The detected RSSI may also be a function of: [1] antenna location of the inquiry scanning device sending the signal and [2] antenna location of the inquiring device sensing the signal. The results may be improved if the antennas were brought into close proximity, which may require moving away from obstructions and changing the orientation of one or both devices.

E. Wireless Device Discovery

FIG. 1 is an example network diagram of four communication devices, two devices each having both a Bluetooth LE radio and a Bluetooth BR/EDR radio, a third device with only a Bluetooth LE radio and a fourth device with only a Bluetooth BR/EDR radio, in accordance with at least one embodiment of the present invention. In accordance with an example embodiment of the invention, the Bluetooth touch-to-select (T2S) operation between two wireless devices, may be enhanced by multiplexing Bluetooth Low Energy (LE) device discovery mechanisms with Bluetooth Basic Rate/ Enhanced Data Rate (BR/EDR) device discovery mechanisms.

In accordance with an example embodiment of the invention, a multi-radio communication device may include a Bluetooth LE radio and a Bluetooth BR/EDR radio. Two such multi-radio communication devices, A and B, may enhance touch-to-select (T2S) operations between themselves when the device B is discoverable both with Bluetooth LE and Bluetooth BR/EDR radios.

FIG. 1A is an example network diagram of two multi-radio communication devices, A and B, each with a Bluetooth LE radio 102 and a Bluetooth BR/EDR radio 104. The first communication device A is shown detecting a sequence of Bluetooth LE advertising channel messages 150 in the Bluetooth LE communications protocol during device discovery scans. In one example of how device multiplexing and tracking may be done, the first communication device A may synchronize its timing of the device discovery scans with the Bluetooth LE advInterval timing of the detected sequence of Bluetooth LE advertising channel messages 150 in the Bluetooth LE communications protocol, in accordance with at least one embodiment of the present invention.

In accordance with an example embodiment of the invention, the Bluetooth LE radio 102 in device A may synchronize timing of the device discovery scans with the detected sequence of Bluetooth LE wireless device advertising channel messages, enabling of detecting simultaneously Bluetooth BR/EDR messages from the second or more devices, such as device C in FIG. 1, which is discoverable via Bluetooth LE or device D in FIG. 1, which is discoverable only with Bluetooth BR/EDR. In this manner, the device A may more rapidly estimate the distance to devices B, C and D by determining first if at least one of the Bluetooth LE wireless device advertising channel messages or the Bluetooth BR/EDR messages meets a predefined criterion of a received signal strength indication of the at least one message exceeding a threshold value.

In accordance with an example embodiment of the invention, for all undirected advertising events, the time between the start of two consecutive advertising events (T_advEvent) may be computed for each advertising event as:

$$T\_advEvent=advInterval+advDelay.$$

In accordance with an example embodiment of the invention, the advInterval timing for a sequence of Bluetooth LE advertising packets 150 may be an integer multiple of 0.625 ms in the range of 20 ms to 10.24 s.

In accordance with an example embodiment of the invention, the Bluetooth LE radio 102A in device A may transfer the received advInterval timing value to a tracked device list 105 that is shared with the Bluetooth BR/EDR radio 104A. The Bluetooth BR/EDR radio 104A in device A may multiplex the transmission of the sequence of wireless inquiry messages 152 in FIG. 1B, multiplexing it with the detected sequence Bluetooth LE wireless device advertising channel messages 150. In this manner, the device A may more rapidly estimate the distance to device B, C and D and determine if at least one of the Bluetooth BR/EDR wireless inquiry response messages 158 in FIG. 1C, or Bluetooth LE advertising messages 150 meets a predefined criterion of a received signal strength indication of the at least one message exceeding a threshold value.

The above description is one example of how device multiplexing and tracking may be done in accordance with the invention. Alternately, device tracking by Bluetooth LE advertisement tracking and inquiry activity positioning may be done in multiple levels in device A. The host level software or an application specific integrated circuit in device A may track Bluetooth LE advertising packets and activate or stop transmitting inquiry packets, based on the detection of the advertising packets, and control radio usage according to the tracked activity.

Device A may include a host application 100A, a Bluetooth LE radio 102A, a Bluetooth BR/EDR radio 104A, a tracked device list 105, and a Bluetooth modem 472. The Bluetooth LE radio 102A may include a Bluetooth LE protocol stack 402. The Bluetooth BR/EDR radio 104A may include a Bluetooth BR/EDR protocol stack 404. The second communication device B may include substantially the same type of components.

In accordance with an example embodiment of the invention, the two such multi-radio communication devices, A and B, may enhance touch-to-select (T2S) operations between themselves. For example, the Bluetooth LE radio in device A, during device discovery scans, may detect the sequence of Bluetooth LE advertising packets 150 from the Bluetooth LE radio in the second communication device B, the advertising packets 150 arriving with the advInterval timing. The Bluetooth LE radio in device A may synchronize timing of the device discovery scans with the detected sequence of Bluetooth LE wireless device advertising channel messages 150 using the advInterval timing, to increase the probability of detecting additional Bluetooth LE wireless device advertising channel messages from the second device B. In this manner, the device A may more rapidly estimate the distance to device B by determining that at least one of the Bluetooth LE wireless device advertising channel messages 150 meets a predefined criterion of a received signal strength indication of the at least one message 150 exceeding a threshold value. In accordance with an example embodiment of the invention, the Bluetooth LE radio in device A may transfer the advInterval timing value to the tracked device list 105 that is shared with the Bluetooth BR/EDR radio in device A.

In accordance with an example embodiment of the invention, the device A may determine that at least one of the wireless device advertising channel messages 150 in the Bluetooth LE communications protocol meets a predefined criterion of a received signal strength indication (RSSI) exceeding a threshold value. In accordance with an example embodiment of the invention, the device A may initiate establishment of a wireless connection with a source device B of one or more wireless device advertising channel messages 150 that meets the predefined criterion of a received signal strength indication exceeding a threshold value. In accordance with an example embodiment of the invention, the device A may display an indication that a wireless connection will be automatically established with the source device B of the one or more wireless device advertising channel messages 150 that meet the predefined criterion.

FIG. 1B is the example network diagram of FIG. 1A, wherein the Bluetooth LE radio in the first communication device A, stores the Bluetooth LE advInterval timing in the tracked device list 105 that is shared with the Bluetooth BR/EDR radio. The Bluetooth BR/EDR radio in the first communication device A then multiplexes transmission of a sequence of Bluetooth BR/EDR inquiry packets 152 in the Bluetooth BR/EDR communications protocol, multiplexing it with the Bluetooth LE scanning activity, detecting sequence of Bluetooth LE advertising channel messages 150 in the Bluetooth LE communications protocol, in response to the detecting of the sequence Bluetooth LE advertising channel messages 150, in accordance with at least one embodiment of the present invention.

In accordance with an example embodiment of the invention, the Bluetooth BR/EDR radio in device A may access the advInterval timing from the tracked device list 105 and prepare a sequence of wireless inquiry packets 152 with the advInterval timing. The Bluetooth BR/EDR radio in device A may multiplex the transmission of the sequence of wireless inquiry messages 152 to the Bluetooth BR/EDR radio in the second device B, multiplexing it with the detected sequence Bluetooth LE wireless device advertising channel messages 150. In this manner, the first device A may more rapidly estimate the distance to device B by determining that at least one of the Bluetooth LE advertising channel messages 150 or Bluetooth BR/EDR wireless inquiry response messages 158 meets a predefined criterion of a received signal strength indication of the at least one message exceeding a threshold value.

In the Bluetooth BR/EDR protocol, after the inquiry scanning device B receives an inquiry packet 152, the inquiry scanning device B replies with an inquiry response packet (FHS) 158 after an interval of only 625 microseconds. Although these two events occur in a very short time interval, the events of the transmission of inquiry packet 152 and the receipt of the inquiry response packet 158 by device A are shown in two separate figures, FIGS. 1B and 1C, so as to more clearly illustrate these two events.

Figure 1C:
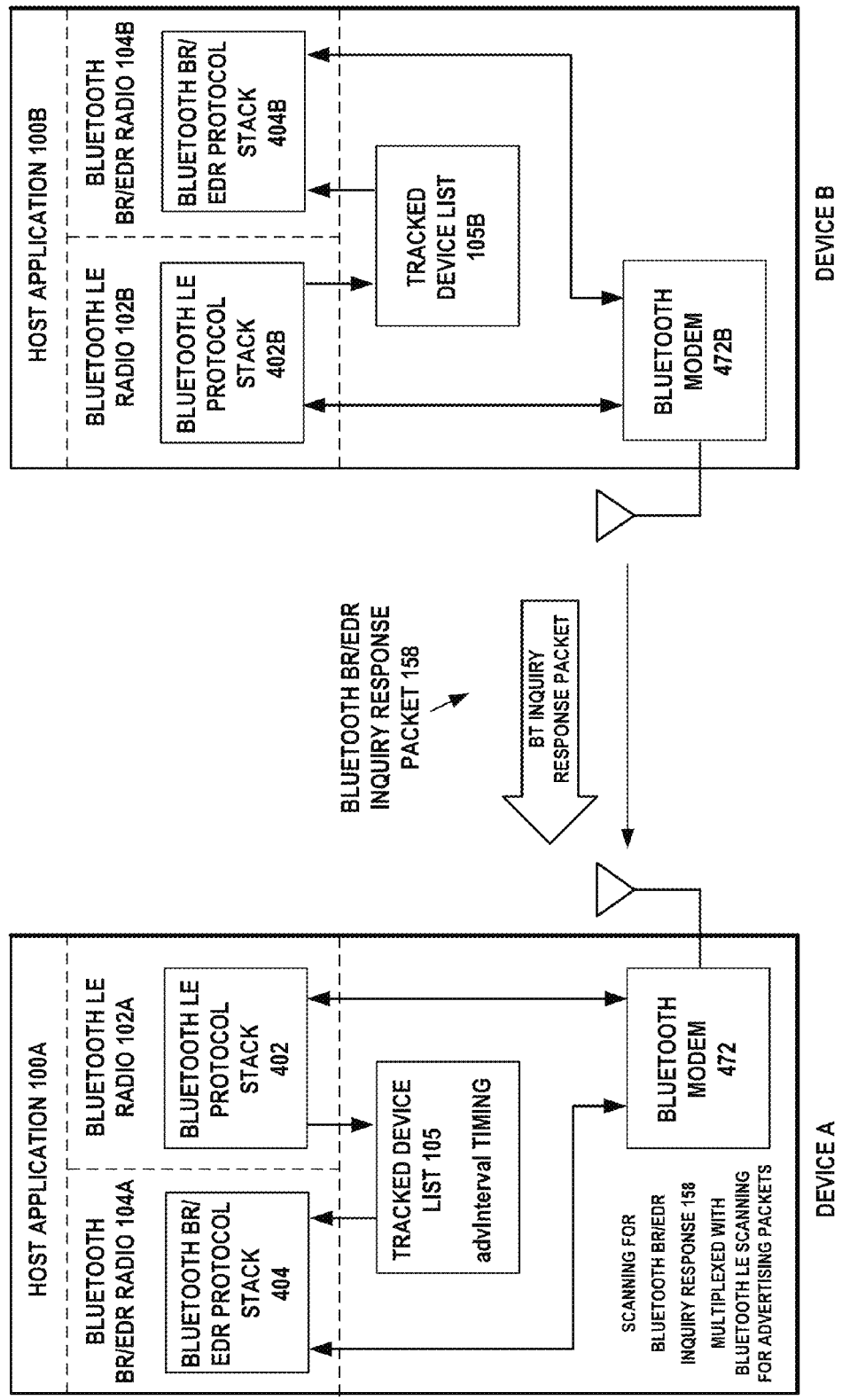
FIG. 1C is the example network diagram of FIG. 1A, wherein the Bluetooth BR/EDR radio in the first communication device A multiplexes device discovery scanning of inquiry response messages in the Bluetooth BR/EDR communications protocol, multiplexing it with the detected sequence Bluetooth LE advertising channel messages in the Bluetooth LE communications protocol, in response to the detecting of the sequence Bluetooth LE advertising channel messages, in accordance with at least one embodiment of the present invention.

FIG. 1C is the example network diagram of FIG. 1A, wherein the Bluetooth BR/EDR radio 104A in the first communication device A multiplexes inquiry and device discovery scanning of inquiry response messages 158 in the Bluetooth BR/EDR communications protocol, multiplexing it with the detected sequence Bluetooth LE advertising channel messages 150 in the Bluetooth LE communications protocol, in response to the detecting of the sequence Bluetooth LE advertising channel messages 150, in accordance with at least one embodiment of the present invention.

In accordance with an example embodiment of the invention, the device A may determine that at least one of the wireless device response messages 158 in the Bluetooth BR/EDR communications protocol meets a predefined criterion of a received signal strength indication (RSSI) exceeding a threshold value. In accordance with an example embodiment of the invention, the device A may initiate establishment of a wireless connection with a source device B of one or more wireless device response messages 158 that meets the predefined criterion of a received signal strength indication exceeding a threshold value. In accordance with an example embodiment of the invention, the device A may display an indication that a wireless connection will be automatically established with the source device B of the one or more wireless device response messages 158 that meet the predefined criterion.

FIG. 2A is an example functional block diagram of the multi-radio communication device A of FIG. 1A, showing additional details of the Bluetooth LE radio 102A and the Bluetooth BR/EDR radio 104A. The first communication device A is shown synchronizing its timing of its device discovery scans (inquiry and inquiry scans) with the Bluetooth LE advInterval timing of the detected sequence of Bluetooth LE advertising channel messages 150 in the Bluetooth LE communications protocol, in accordance with at least one embodiment of the present invention.

In accordance with an example embodiment of the invention, the figure shows the first communications device A, illustrating the host application 100A, the Bluetooth LE protocol stack 402, and the Bluetooth BR/EDR protocol stack 404. Communications device A may include an example radio embodiment with a wireless communications protocol such as the Bluetooth LE radio 102A. The Bluetooth LE protocol stack 402 in the Bluetooth LE radio 102A, in example embodiments, may include Bluetooth host controller interface (HCI) upper layer protocols 110, Bluetooth LE logical link layer controller 120, and Bluetooth LE MAC sublayer 130. The protocol stack 402 may have its digital baseband transmission path outputting its signal to the physical layer (PHY) radio 470. On the receive side, the radio 470 outputs the received signal to the digital baseband transmission path of the protocol stack 402, according to an embodiment of the present invention.

In accordance with an example embodiment of the invention, the example Bluetooth LE protocol stack 402 in example embodiments may have the digital baseband transmission path of the Bluetooth LE MAC sublayer 130 output the digital baseband signal through PHY logic 470 to a digital-to-analog converter and transmitter of an example radio frequency (RF) radio 470. The modulated output of the RF radio 470 from modem 472, may be amplified by a power amplifier (AMP) and applied to a transmit/receive switch and the antenna of the Bluetooth link. In receiving signals, such as Bluetooth LE packet 150, on the antenna of the Bluetooth link, the transmit/receive switch passes the RF signal to the receiver of the RF radio 470 and an analog-to-digital converter. The demodulated digital baseband signal then passes through PHY layer logic 470 to the Bluetooth LE MAC sublayer 130 of the Bluetooth LE protocol stack 402.

In accordance with an example embodiment of the invention, communications device A may include an example radio embodiment with a wireless communications protocol such as the Bluetooth BR/EDR radio 104A. The Bluetooth BR/EDR protocol stack 404 in the Bluetooth BR/EDR radio 104A, in example embodiments, may include Bluetooth host controller interface (HCI) upper layer protocols 110', Bluetooth BR/EDR logical link layer controller 120', and Bluetooth BR/EDR MAC sublayer 130'. The protocol stack 404 may have its digital baseband transmission path outputting its signal to the physical layer (PHY) radio 470. On the receive side, the radio 470 outputs the received signal to the digital baseband transmission path of the protocol stack 404, according to an embodiment of the present invention.

In accordance with an example embodiment of the invention, the communications device A may include a processor 422, which may include a single core CPU or multiple core central processing unit (CPU) 424 and 425, a random access memory (RAM) 426, a read only memory (ROM) 427, and interface circuits 428 to interface with one or more radio transceivers, battery or house power sources, keyboard, display, key pad, touch screen, display, microphone, speakers, ear pieces, camera or other imaging devices, etc. The RAM and ROM may be removable memory devices 495 such as smart cards, SIMs, WIMs, semiconductor memories such as RAM, ROM, PROMS, flash memory devices, etc.

In accordance with an example embodiment of the invention, an example embodiment of the host application 100A, HCI upper layer protocols, and the Bluetooth stack LE 402, and Bluetooth BR/EDR stack 404 may be computer program code instructions stored in the RAM 426 and/or ROM 427 memory of the processor 422, which when executed by the central processing units (CPU) 424 and or 425, carry out the functions of the example embodiments of the invention. Alternately, some or all of these instructions may be embodied as hardware program logic included in programmed logic arrays of sequential and/or combinatorial logic circuits and/or state machine logic implementing some or all of the steps performed by embodiments of the invention.

Figure 2B:
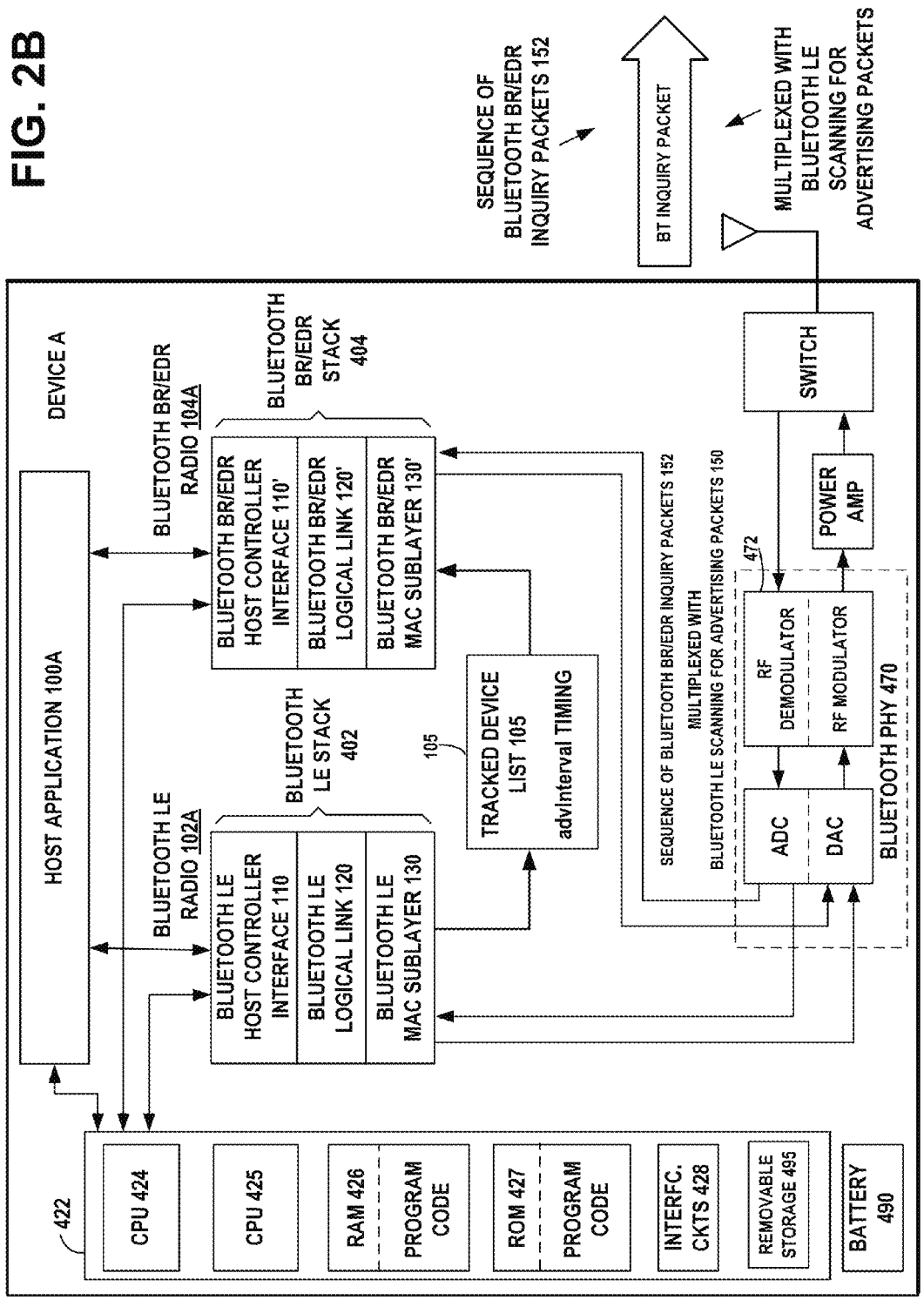
FIG. 2B is the example functional block diagram of FIG. 2A, wherein the Bluetooth LE radio in the first communication device A, stores the Bluetooth LE advInterval timing in a tracked device list that is shared with the Bluetooth BR/EDR radio. The Bluetooth BR/EDR radio in the first communication device A then multiplexes transmission of a sequence of Bluetooth BR/EDR inquiry packets in the Bluetooth BR/EDR communications protocol, multiplexing it with the detected sequence of Bluetooth LE advertising channel messages in the Bluetooth LE communications protocol, in response to the detecting of the sequence Bluetooth LE advertising channel messages, in accordance with at least one embodiment of the present invention.

FIG. 2B is the example functional block diagram of FIG. 2A, wherein the Bluetooth LE radio in the first communication device A, stores the Bluetooth LE advInterval timing in a tracked device list that is shared with the Bluetooth BR/EDR radio. The Bluetooth BR/EDR radio in the first communication device A then multiplexes transmission of a sequence of Bluetooth BR/EDR inquiry packets in the Bluetooth BR/EDR communications protocol, multiplexing it with the detected sequence of Bluetooth LE advertising channel messages in the Bluetooth LE communications protocol, in response to the detecting of the sequence Bluetooth LE advertising channel messages, in accordance with at least one embodiment of the present invention.

FIG. 2C is the example functional block diagram of FIG. 2A, wherein the Bluetooth BR/EDR radio in the first communication device A multiplexes device discovery scanning of inquiry response messages in the Bluetooth BR/EDR communications protocol, multiplexing it with the detected sequence Bluetooth LE advertising channel messages in the Bluetooth LE communications protocol, in response to the detecting of the sequence Bluetooth LE advertising channel messages. The first communication device A may determine that at least one of the Bluetooth LE advertising channel messages in the Bluetooth LE communications protocol and the inquiry response messages in the Bluetooth BR/EDR communications protocol, meets a predefined criterion of a received signal strength indication exceeding a threshold value. The first communication device A may estimate a distance to a second communication device B that transmitted at least one of the Bluetooth LE advertising channel messages in the Bluetooth LE communications protocol and the inquiry response messages in the Bluetooth BR/EDR communications protocol, based on the received signal strength indication. The first communication device A may determine that the second communication device B is within a distance from the first communication device A, which indicates touching-related operations may be executed, based on the received signal strength indication, in accordance with at least one embodiment of the present invention.

Figure 3:
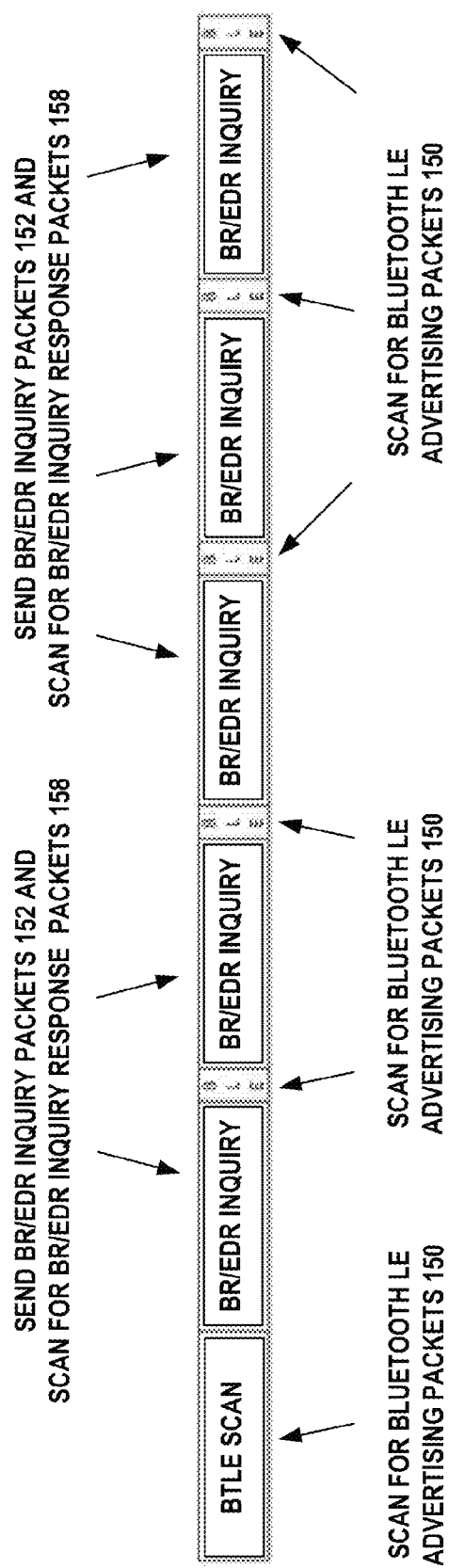
FIG. 3 is an example embodiment of a timing chart for the sequence of sending Bluetooth BR/EDR inquiry packets multiplexed with Bluetooth LE scanning for advertising packets, in accordance with at least one embodiment of the present invention.

FIG. 3 is an example embodiment of a timing chart for the sequence of sending Bluetooth BR/EDR inquiry packets multiplexed with Bluetooth LE scanning for advertising packets, in accordance with at least one embodiment of the present invention. The multiplexing is based on performing one or more Bluetooth LE scans of the Bluetooth LE wireless device advertising channel messages 150 and tracking selected ones of the source devices found during the scan, and then transmitting Bluetooth BR/EDR inquiry packets 152 using the advInterval timing of the Bluetooth LE advertising channel messages 150. In accordance with an example embodiment of the invention, the transmission times of the Bluetooth LE wireless device advertising channel messages 150 may be estimated, whereas the transmission of the Bluetooth BR/EDR inquiry packets 152 is random.

Figure 3A:
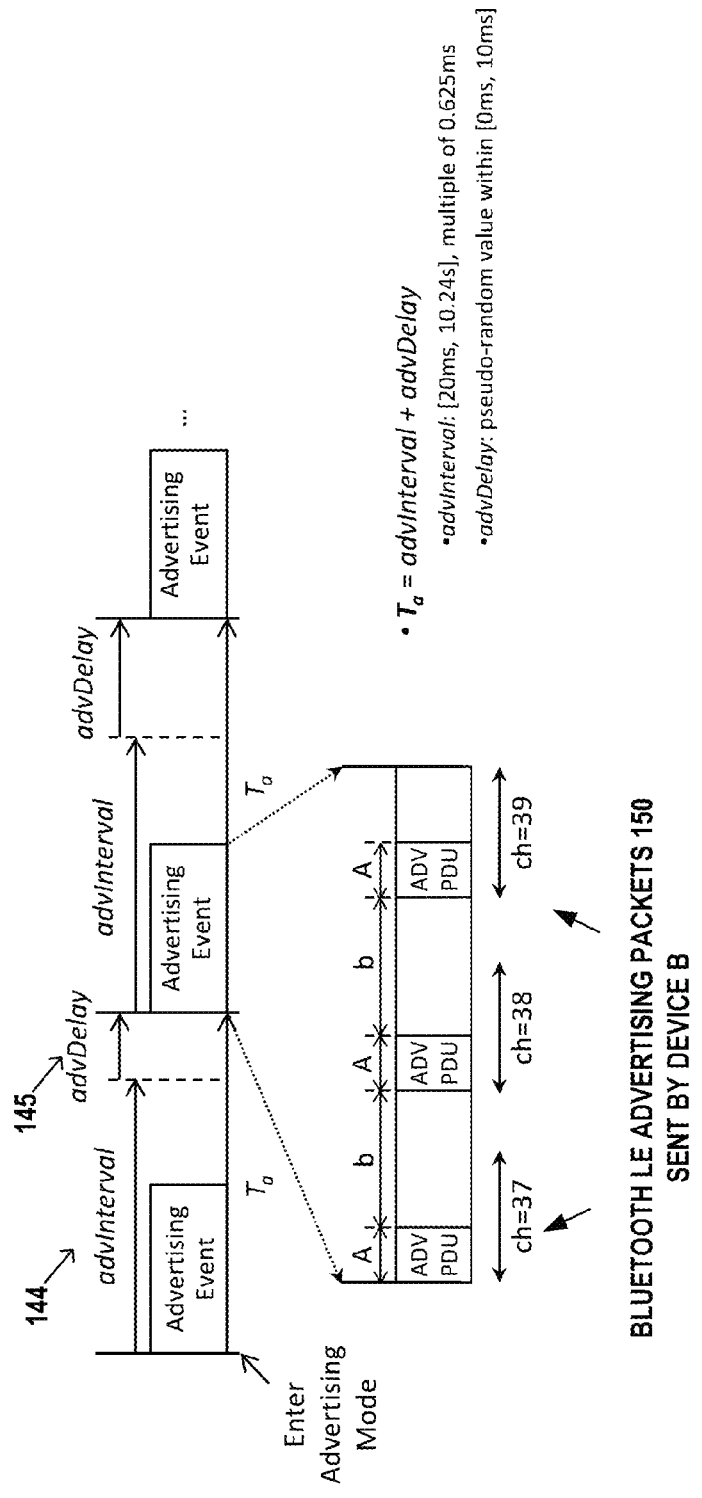
FIG. 3A is an example embodiment of a timing chart for transmission of Bluetooth LE advertising messages by the second communication device B, wherein the advertiser device repeatedly enters Advertising Events, in accordance with an example embodiment of the invention.

FIG. 3A is an example embodiment of a timing chart for transmission of Bluetooth LE advertising messages by the second communication device B, wherein the advertiser device repeatedly enters Advertising Events, in accordance with an example embodiment of the invention. In transmission of advertising messages 150 by an advertiser device B, the advertiser device B repeatedly enters Advertising Events. The interval, Ta, of each Advertising Event, is composed of a fixed-length advInterval 144 and a random-length advDelay 145. In an Advertising Event, the advertising device B sends advertising Packet Data Units (PDUs) 150 in broadcasting channel 37, 38 and 39, respectively, in accordance with an example embodiment of the invention. For all undirected advertising events, the time between the start of two consecutive advertising events (T_advEvent) is computed by T_advEvent=advInterval+advDelay. The advInterval is an integer multiple of 0.625 ms ranging from 20 ms to 10.24 s; the advDelay is a pseudo-random value within a range of 0 ms to 10 ms generated by the Link Layer for each advertising event.

In accordance with an example embodiment of the invention, advertising channel indexes may either be used or unused. The Link Layer shall use the advertising channel indexes as specified by the Host, and the used advertising channel indexes shall take effect when the Advertising State is entered.

In accordance with an example embodiment of the invention, for all undirected advertising events, the time between the start of two consecutive advertising events (T_advEvent) is computed as follows for each advertising event:

$$T\_advEvent=advInterval+advDelay$$

In accordance with an example embodiment of the invention, the advInterval shall be an integer multiple of 0.625 ms in the range of 20 ms to 10.24 s. If the advertising event type is either a scannable undirected event type or a non-connectable undirected event type, the advInterval shall not be less than 100 ms. If the advertising event type is a connectable undirected event type, the advInterval can be 20 ms or greater. The advDelay is a pseudo-random value with a range of 0 ms to 10 ms generated by the Link Layer for each advertising event.

FIG. 3B is an example embodiment of a timing chart for Bluetooth LE scanning by the first communication device A to discover Bluetooth LE advertising messages, wherein the scanner device repeats scanning during a scanInterval, each of which contains a scanWindow, in accordance with an example embodiment of the invention. In the scanning by an initiator/scanner device A to discover advertising messages 150, the initiator/scanner device A repeats scanning during a scanInterval 148, each of which contains a scanWindow 149. In consecutive scanWindows 149, the initiator/scanner device A changes its RF module to the receive state and listens to advertising PDUs 150 on different broadcasting channels. While outside of the scanWindow 149, the initiator/scanner device A may do routine scheduling, or it may turn off its RF module, in accordance with an example embodiment of the invention.

Figure 3C:
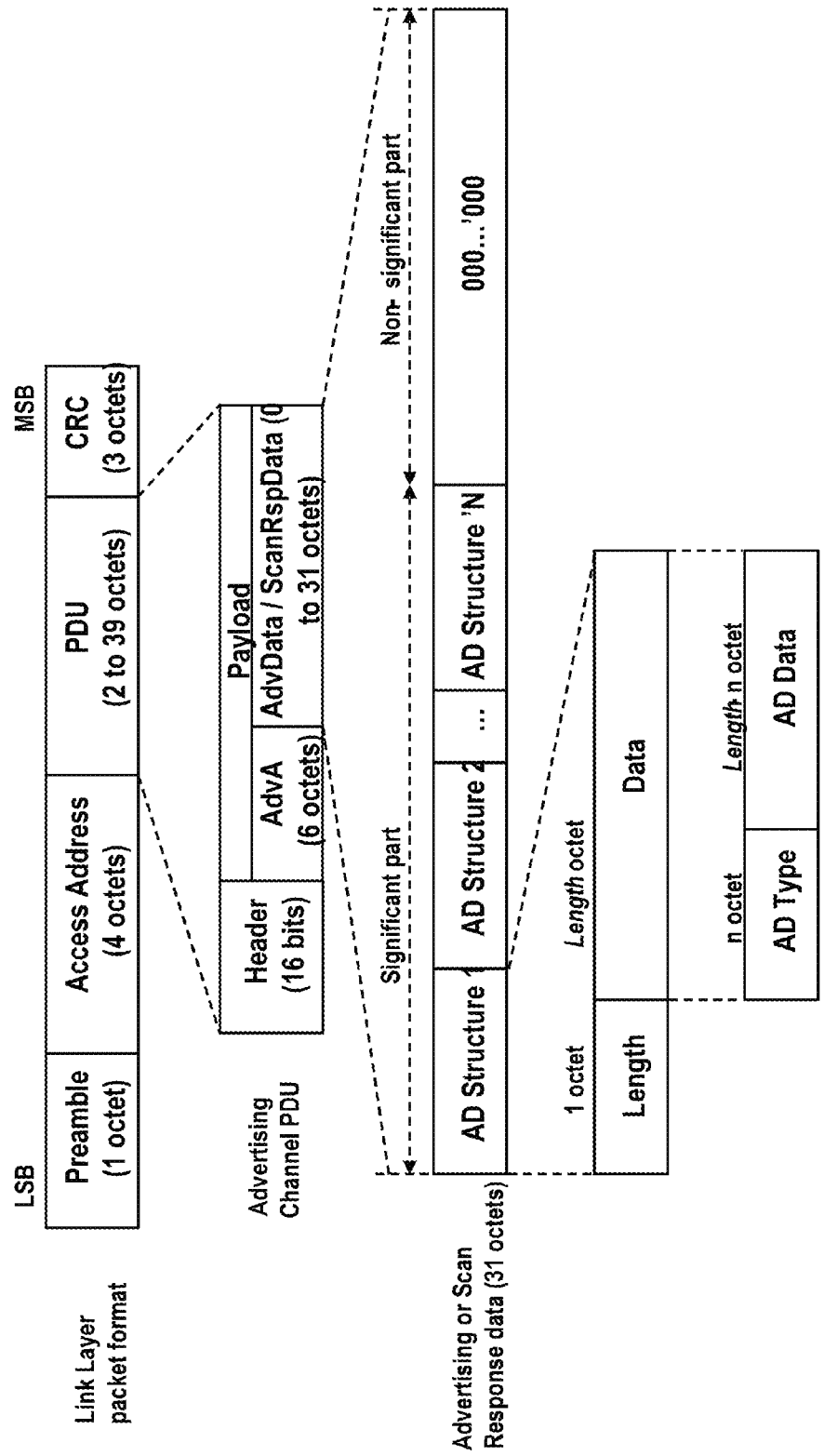
FIG. 3C is an example format of an example Bluetooth LE advertising channel packet (PDU) that the second communication device B transmits on an advertising channel to the scanner devices, in accordance with an example embodiment of the invention.

FIG. 3C is an example format of an example Bluetooth LE advertising channel packet (PDU) 150 that the second communication device B transmits on an advertising channel to the scanner devices, in accordance with an example embodiment of the invention. The Bluetooth LE advertising channel packet (PDU) 150 may contain information about a time interval, advInterval 144, available to the advertiser device B for transmission of advertising channel messages 150.

In accordance with an example embodiment of the invention, the Bluetooth LE link layer has only one packet format used for both advertising channel packets and data channel packets. Each packet consists of four fields: the preamble, the Access Address, the protocol data unit (PDU), and the cyclic redundancy code (CRC). The preamble is 1 octet and the Access Address is 4 octets. The PDU range is from 2 to a maximum of 39 octets. The CRC is 3 octets. The Access Address for all advertising channel packets is hex value 0x8E89BED6.

In accordance with an example embodiment of the invention, the preamble and Access Address are followed by a PDU. The advertising channel PDU has a 16-bit header and a variable size payload. A PDU Type field of the advertising channel PDU that is contained in the header, indicates the PDU type. A Length field of the advertising channel PDU header indicates the payload field length in octets, and may be 6 to 37 octets.

In accordance with an example embodiment of the invention, in the data format of advertising and scan response, the advertising data (31 Octets) has two parts: significant part and non-significant part. The significant part carries the advertising data that is encapsulated within multiple AD Structures. Each AD Structure contains a Length field and a Data field, and each Data field further contains AD Type and AD Data.

FIG. 3D is an illustration of an example timing diagram of the device discovery process, using the Bluetooth communications standard, in accordance with at least one embodiment of the present invention. The following is one example embodiment applied to Bluetooth technology.

In the Bluetooth specification, during the inquiry procedure, the inquiring device or master device A transmits inquiry messages, ID packet 152, with the general or dedicated inquiry access code. An inquiry response packet (FHS) 158 is transmitted from the inquiry scanning device or slave B to the master A after the slave has received the inquiry message 152. In addition, the inquiry scanning device B may send an Extended Inquiry Response (EIR) packet 160 after the FHS packet 158, to deliver more information about the inquiry scanning device B. The EIR packet 160 may include for example name of the inquiry scanning device 100 or transmission power.

If the inquiry scanning device B transmits an extended inquiry response packet 160, it is transmitted 1250 microseconds after the start of the inquiry response FHS packet 158. The extended inquiry response packet 160 is received by the inquiring device A at the hop frequency when the inquiry message received by the inquiry scanning device B was first in the master-to-slave slot. The extended inquiry response packet is an Asynchronous Connection-oriented Logical transport (ACL) packet with type DM1, DM3, DM5, DH1, DH3 or DH5.

FIG. 4A is an illustration of an example message format for Bluetooth BR/EDR inquiry, device discovery message, using the Bluetooth communications standard, in accordance with at least one embodiment of the present invention. FIG. 4A is an illustration of an example message format for device discovery messages 152, using the Bluetooth communications standard, in accordance with at least one embodiment of the present invention. During the inquiry procedure, the inquiring device A or master transmits inquiry messages 150 with the general or dedicated inquiry access code. The identity or ID packet consists of the inquiry access code (IAC). It has a fixed length of 68 bits. The inquiry hop sequence is derived from the Lower Address Part (LAP) of the General Inquiry Access Code (GIAC).

FIG. 4B is an illustration of an example message format for Bluetooth BR/EDR inquiry response, discovery response message, using the Bluetooth communications standard, in accordance with at least one embodiment of the present invention. FIG. 4B is an illustration of an example message format for inquiry response messages 158, using the Bluetooth communications standard, in accordance with at least one embodiment of the present invention. An inquiry response packet (FHS) 158 is transmitted from the inquiry scanning device B or slave to the master after the slave has received an inquiry message 152. The inquiry response packet 158 contains information necessary for the inquiring device A to page the slave and follows 625 microseconds after the receipt of the inquiry message 152. The inquiry response packet 158 is received by the inquiring device A at the hop frequency when the inquiry message 152 received by the slave was first in the master-to-slave slot. When the inquiry message 152 is received in the inquiry scan substate, the inquiry scanning device B may return an inquiry response (FHS) packet 158 containing the recipient's device address (BD_ADDR) and other parameters. If the recipient has non-zero extended inquiry response data to send, it indicates this by the EIR bit 159, indicating that it will return an extended inquiry response packet 160 after the FHS packet 158. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit 159 set to zero.

FIG. 4C is an illustration of an example message format for Bluetooth BR/EDR extended inquiry response, discovery response message, using the Bluetooth communications standard, in accordance with at least one embodiment of the present invention. FIG. 4C is an illustration of an example message format for extended discovery response messages 160, using the Bluetooth communications standard, in accordance with at least one embodiment of the present invention. An Extended Inquiry Response 160 may be used to provide miscellaneous information during the inquiry response procedure. Data types are defined for such things as local name and supported services, information that otherwise would have to be obtained by establishing a connection. The inquiring device A that receives a local name and a list of supported services in an extended inquiry response does not have to connect to do a remote name request and a service discovery protocol (SDP) service search, thereby shortening the time to useful information. If the inquiry scanning device B transmits an extended inquiry response packet 160, it is transmitted 1250 microseconds after the start of the inquiry response packet 158. The extended inquiry response packet 160 is received by the inquiring device A at the hop frequency when the inquiry message 152 received by the inquiry scanning device B was first in the master-to-slave slot.

Figure 5A:
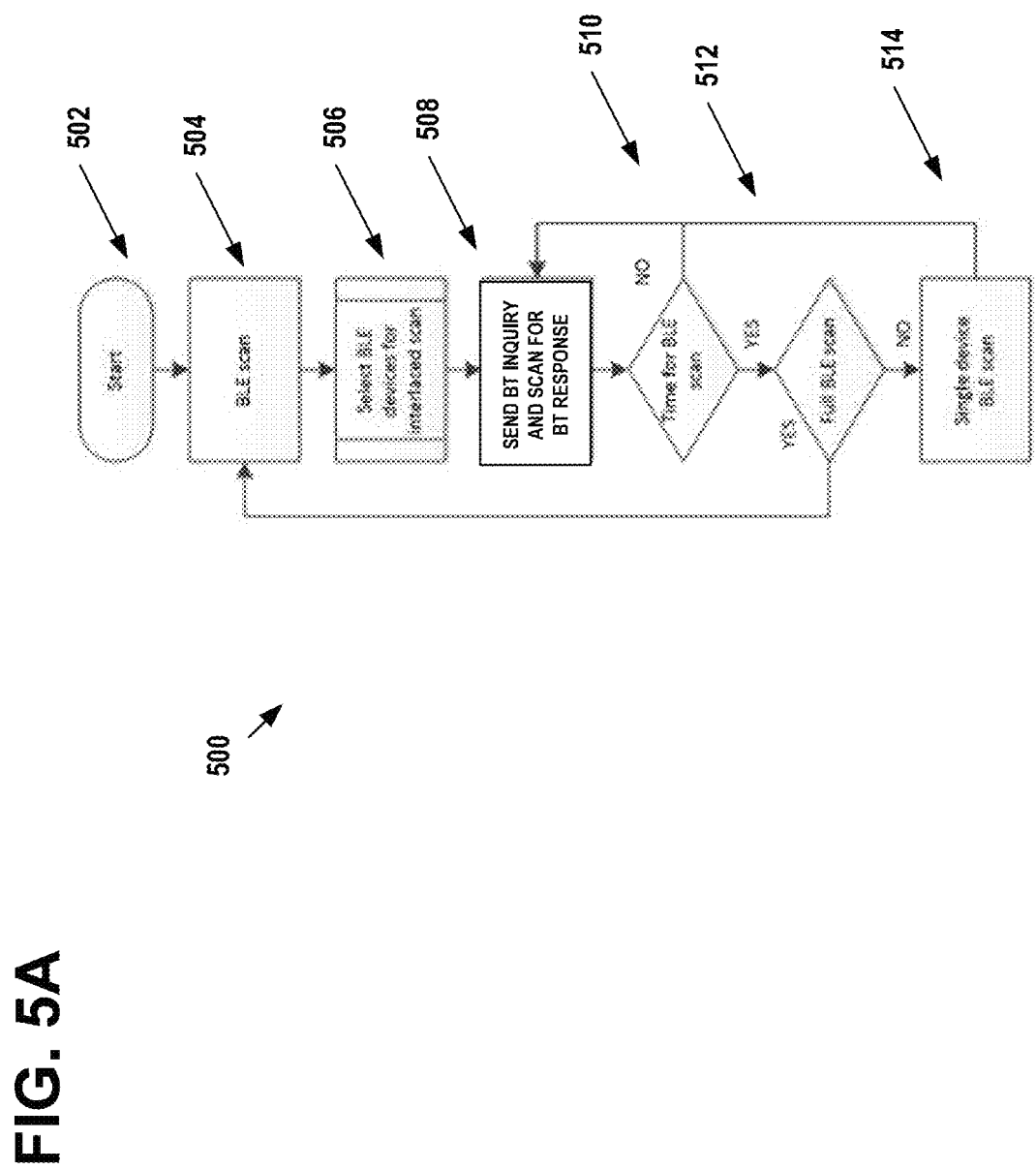
FIG. 5A is an example flow diagram 500 of an example method performed by the multi-radio communication device A, illustrating multiplexing transmission of a sequence of Bluetooth BR/EDR inquiry device discovery messages, with the detected sequence of Bluetooth LE advertising channel messages, in accordance with an example embodiment of the invention.

FIG. 5A is an example flow diagram 500 of an example method performed by the multi-radio communication device A, illustrating multiplexing transmission of a sequence of Bluetooth BR/EDR inquiry device discovery messages, with the detected sequence of Bluetooth LE advertising channel messages, in accordance with an example embodiment of the invention. In accordance with an example embodiment of the invention, the technical implementation may include performing Bluetooth LE scan which may last for 1.28 s. Then selected Bluetooth LE devices are tracked when performing the Bluetooth BR/EDR page. The method starts in step 504 with Bluetooth LE scan, which may last for example 1.28 s and is performed when the touch-to-select (T2S) device discovery is started. When Bluetooth LE scan is ready, certain devices are selected to be tracked in step 506 during Bluetooth BR/EDR inquiry process (the selection may performed during or after Bluetooth LE scan). The selection may include for example all devices, only device which are estimated to be in close proximity based on RSSI measurement, or defined number of closest devices. Then Bluetooth BR/EDR inquiry is started in step 508. The inquiry may be interrupted in step 510 when a Bluetooth LE advertisement from tracked devices is estimated be happening or Bluetooth LE tracked device list is wanted to be updated. Here Bluetooth LE is doing first 1.28 scan in step 512, to get information of devices. Here it is assumed that advertisement interval is 1.28 s (device may use longer scan time to get "second hit" and that way to be able to sync longer advertisement intervals.) After Dev A Bluetooth LE has sync and the followed devices are selected (device C dropped in here because low RSSI), Dev A scans in step 514 only during advertisement time windows (+− some ms for jitter). There could be another predefined RSSI threshold value, which may provide a threshold for certain device selection. If e.g. the RSSI indication exceeds the predefined threshold value, source device of the advertisement message or Inquiry response message is selected for wireless connection establishment. In connection with the wireless connection establishment, an indication of the wireless connection establishment may be provided to the user of the device via display. Upon establishment of the communication connection, an action, such as sending a picture to the source device over Bluetooth OBEX protocol may be performed.

FIG. 5B is an example flow diagram 550 of an example method performed by the multi-radio communication device A, in accordance with an example embodiment of the invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 552: detecting, by an apparatus, a sequence of wireless device advertising channel messages in a first communications protocol during device discovery scans of the first communications protocol; and Step 554: multiplexing, by the apparatus, transmission of a sequence of wireless device discovery messages in a second communications protocol, with the detected sequence of wireless device advertising channel messages in the first communications protocol, in response to the detecting of the sequence of wireless device advertising channel messages in the first communications protocol.

Figure 6A:
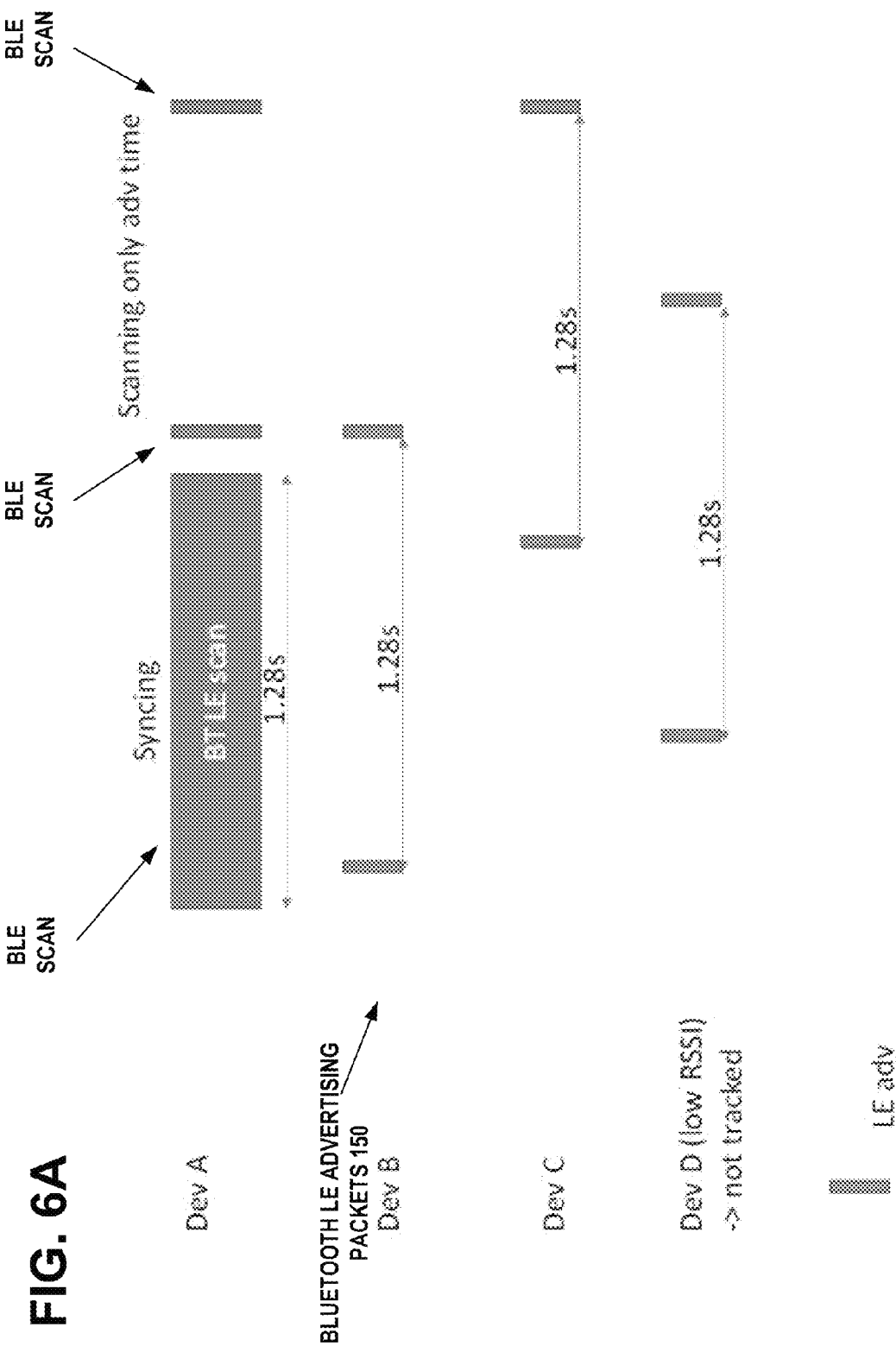
FIG. 6A is an example timing diagram illustrating how two multi-radio communication devices, A and B, may enhance touch-to-select (T2S) operations between themselves by synchronizing timing of the device discovery scans, in accordance with an example embodiment of the invention.

FIG. 6A is an example timing diagram illustrating how two multi-radio communication devices, A and B, may accelerate touch-to-select (T2S) operations between themselves by synchronizing timing of the device discovery scans, in accordance with an example embodiment of the invention. For example, the Bluetooth LE radio in device A, during device discovery scans, may detect a sequence of Bluetooth LE advertising packets from the Bluetooth LE radio in the second communication device B, the advertising packets including the device address of the sending device B. The Bluetooth LE radio in device A may synchronize timing of the device discovery scans with the detected sequence of Bluetooth LE wireless device advertising channel messages, to increase the probability of detecting additional Bluetooth LE wireless device advertising channel messages from the second device. In this manner, the device A may more rapidly estimate the distance to device B by determining that at least one of the Bluetooth LE wireless device advertising channel messages meets a predefined criterion of a received signal strength indication of the at least one message exceeding a threshold value.

Figure 6B:
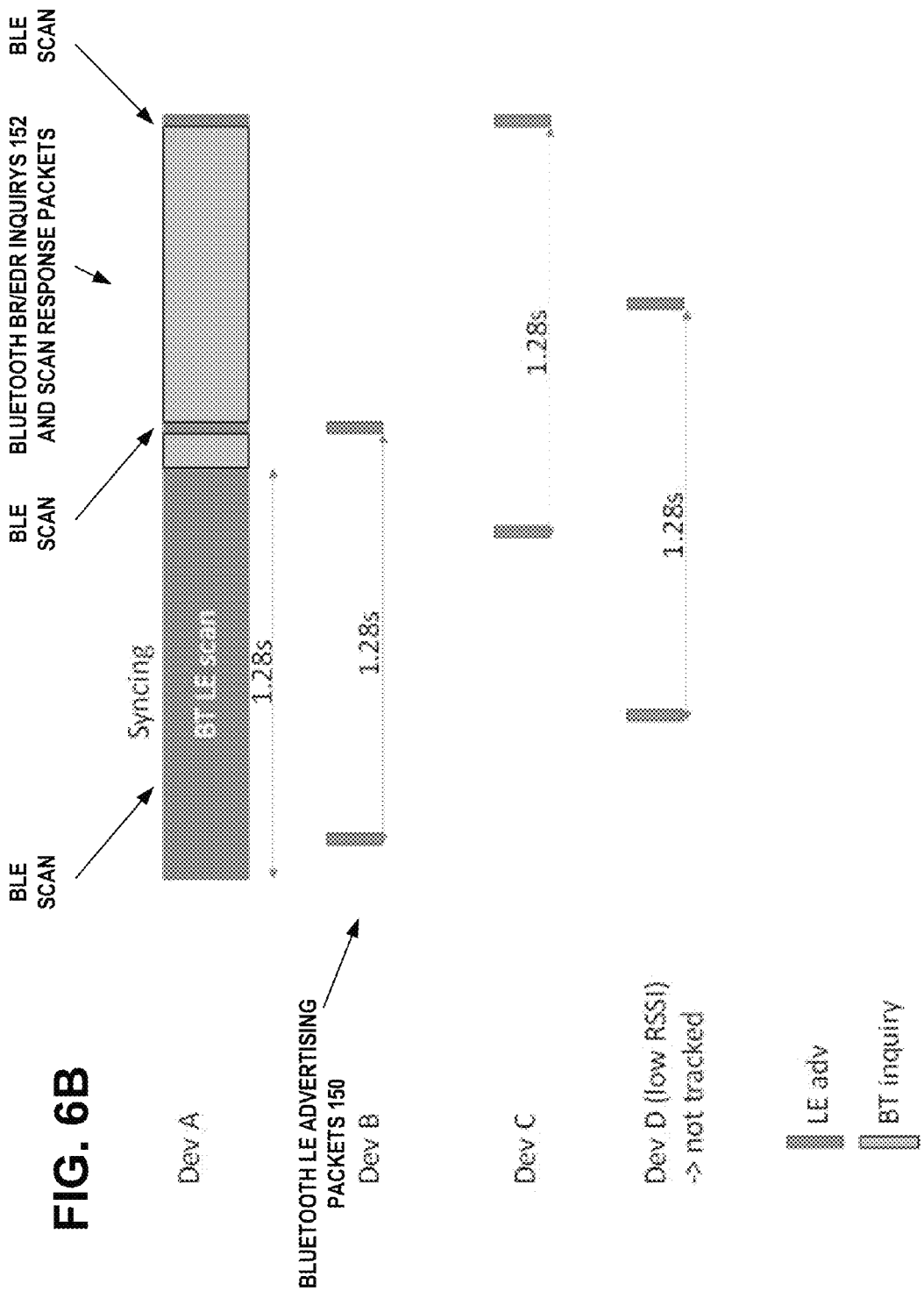
FIG. 6B is an example timing diagram illustrating how two multi-radio communication devices, A and B, may enhance touch-to-select (T2S) operations between themselves by multiplexing the transmission of Bluetooth BR/EDR inquiry packets with the detected sequence Bluetooth LE advertising channel messages, in accordance with an example embodiment of the invention.

FIG. 6B is an example timing diagram illustrating how two multi-radio communication devices, A and B, may enhance touch-to-select (T2S) operations between themselves by multiplexing the transmission of Bluetooth BR/EDR inquiry packets with the detected sequence Bluetooth LE advertising channel messages, in accordance with an example embodiment of the invention. The Bluetooth BR/EDR radio in device A may access the advInterval timing from the tracked device list and prepare a sequence of wireless inquiry packets. The Bluetooth BR/EDR radio in device A may multiplex the transmission of the sequence of wireless inquiry messages to the Bluetooth BR/EDR radio in the second device B, multiplexing it with the detected sequence Bluetooth LE wireless device advertising channel messages. In this manner, the first device A may more rapidly estimate the distance to device B by determining that at least one of the Bluetooth BR/EDR wireless inquiry response messages or Bluetooth LE advertising messages meets a predefined criterion of a received signal strength indication of the at least one message exceeding a threshold value.

FIG. 7 illustrates an example embodiment of the invention, wherein examples of removable storage media 495 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
  detecting, by an apparatus, a sequence of wireless device advertising channel messages from another device, in a first communications protocol during device discovery scans of the first communications protocol; and
  multiplexing, by the apparatus, transmission of a sequence of wireless device discovery messages in a second communications protocol, with the detected sequence of wireless device advertising channel messages in the first communications protocol, without having a connection to the other device, in response to the detecting of the sequence of wireless device advertising channel messages in the first communications protocol.

2. The method of claim 1, further comprising:
  synchronizing, by the apparatus, timing of the device discovery scans with the detected sequence of wireless device advertising channel messages in the first communications protocol.

3. The method of claim 1, further comprising:
  multiplexing, by the apparatus, device discovery scanning of wireless device response messages in the second communications protocol, with the detected sequence wireless device advertising channel messages in the first communications protocol, in response to the detecting of the sequence of wireless device advertising channel messages in the first communications protocol.

4. The method of claim 3, further comprising:
  determining, by the apparatus, that at least one of the wireless device advertising channel messages in the first communications protocol or the wireless device response messages in the second communications protocol, meets a predefined criterion of a received signal strength indication exceeding a threshold value.

5. The method of claim 4, further comprising:
  initiating, by the apparatus, establishment of a wireless connection with a source device of one or more wireless device advertising channel messages that meets the predefined criterion of a received signal strength indication exceeding a threshold value.

6. The method of claim 5, further comprising:
  displaying, by the apparatus, an indication that a wireless connection will be automatically established with the source device of the one or more wireless device advertising channel messages that meet the predefined criterion.

7. The method of claim 4, further comprising:
  initiating, by the apparatus, establishment of a wireless connection with a source device of one or more wireless device response messages that meets the predefined criterion of a received signal strength indication exceeding a threshold value.

8. The method of claim 7, further comprising:
  displaying, by the apparatus, an indication that a wireless connection will be automatically established with the source device of the one or more wireless device response messages that meet the predefined criterion.

9. The method of claim 1, wherein the first communications protocol is a Bluetooth Low Energy protocol and the second communications protocol is a Bluetooth BR/EDR protocol.

10. An apparatus, comprising:
  at least one processor;
  at least one memory including computer program code;
  the at least one memory and the computer program code configured to, with the at least one processor, cause the apparatus at least to:
  detect a sequence of wireless device advertising channel messages from another device, in a first communications protocol during device discovery scans of the first communications protocol; and
  multiplex transmission of a sequence of wireless device discovery messages in a second communications protocol, with the detected sequence of wireless device advertising channel messages in the first communications protocol, without having a connection to the other device, in response to the detecting of the sequence of wireless device advertising channel messages in the first communications protocol.

11. The apparatus of claim 10, further comprising:
the at least one memory and the computer program code configured to, with the at least one processor, cause the apparatus at least to:
synchronize timing of the device discovery scans with the detected sequence of wireless device advertising channel messages in the first communications protocol.

12. The apparatus of claim 10, further comprising:
the at least one memory and the computer program code configured to, with the at least one processor, cause the apparatus at least to:
multiplex device discovery scanning of wireless device response messages in the second communications protocol, with the detected sequence wireless device advertising channel messages in the first communications protocol, in response to the detecting of the sequence of wireless device advertising channel messages in the first communications protocol.

13. The apparatus of claim 12, further comprising:
the at least one memory and the computer program code configured to, with the at least one processor, cause the apparatus at least to:
determine that at least one of the wireless device advertising channel messages in the first communications protocol or the wireless device response messages in the second communications protocol, meets a predefined criterion of a received signal strength indication exceeding a threshold value.

14. The apparatus of claim 13, further comprising:
the at least one memory and the computer program code configured to, with the at least one processor, cause the apparatus at least to:
initiate establishment of a wireless connection with a source device of one or more wireless device advertising channel messages that meets the predefined criterion of a received signal strength indication exceeding a threshold value.

15. The apparatus of claim 14, further comprising:
the at least one memory and the computer program code configured to, with the at least one processor, cause the apparatus at least to:
display an indication that a wireless connection will be automatically established with the source device of the one or more wireless device advertising channel messages that meet the predefined criterion.

16. The apparatus of claim 13, further comprising:
the at least one memory and the computer program code configured to, with the at least one processor, cause the apparatus at least to:
initiate establishment of a wireless connection with a source device of one or more wireless device response messages that meets the predefined criterion of a received signal strength indication exceeding a threshold value.

17. The apparatus of claim 16, further comprising:
the at least one memory and the computer program code configured to, with the at least one processor, cause the apparatus at least to:
display an indication that a wireless connection will be automatically established with the source device of the one or more wireless device response messages that meet the predefined criterion.

18. The apparatus of claim 10, wherein the first communications protocol is a Bluetooth Low Energy protocol and the second communications protocol is a Bluetooth BR/EDR protocol.

19. A computer program product comprising computer executable program code recorded on a computer readable, non-transitory storage medium, the computer executable program code comprising:
code for detecting, by an apparatus, a sequence of wireless device advertising channel messages from another device, in a first communications protocol during device discovery scans of the first communications protocol; and
code for multiplexing, by the apparatus, transmission of a sequence of wireless device discovery messages in a second communications protocol, with the detected sequence of wireless device advertising channel messages in the first communications protocol, without having a connection to the other device, in response to the detecting of the sequence of wireless device advertising channel messages in the first communications protocol.

20. The computer program product of claim 19, further comprising:
code for multiplexing, by the apparatus, device discovery scanning of wireless device response messages in the second communications protocol, with the detected sequence wireless device advertising channel messages in the first communications protocol, in response to the detecting of the sequence of wireless device advertising channel messages in the first communications protocol.

* * * * *